(12) United States Patent
Imoto

(10) Patent No.: US 7,605,856 B2
(45) Date of Patent: Oct. 20, 2009

(54) CAMERA UNIT AND APPARATUS FOR MONITORING VEHICLE PERIPHERY

(75) Inventor: Masayoshi Imoto, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 730 days.

(21) Appl. No.: 10/935,241

(22) Filed: Sep. 8, 2004

(65) Prior Publication Data

US 2005/0083427 A1    Apr. 21, 2005

(30) Foreign Application Priority Data

Sep. 8, 2003    (JP) .............................. 2003-315597
Apr. 30, 2004    (JP) .............................. 2004-135298

(51) Int. Cl.
H04N 5/225    (2006.01)
(52) U.S. Cl. ...................................... 348/335
(58) Field of Classification Search ................. 348/148, 348/335, 369, 375, 220.1; 396/322, 326, 396/327, 331, 332; 359/462, 466, 618
See application file for complete search history.

(56) References Cited

U.S. PATENT DOCUMENTS

| 4,978,205 | A | * | 12/1990 | Sato | 359/557 |
|---|---|---|---|---|---|
| 5,668,666 | A | * | 9/1997 | Suzuki | 359/674 |
| 5,703,351 | A | * | 12/1997 | Meyers | 250/201.2 |
| 5,756,988 | A | * | 5/1998 | Furuta | 250/208.1 |
| 5,850,578 | A | * | 12/1998 | Ohmura | 396/109 |
| 6,072,636 | A | * | 6/2000 | Sato | 359/668 |
| 6,128,145 | A | * | 10/2000 | Nagaoka | 359/749 |
| 6,181,482 | B1 | * | 1/2001 | Grafton | 359/670 |
| 6,476,855 | B1 | * | 11/2002 | Yamamoto | 348/148 |
| 6,490,086 | B2 | * | 12/2002 | Morishima | 359/443 |
| 6,590,719 | B2 | | 7/2003 | Bos | |
| 6,597,409 | B1 | * | 7/2003 | Shioya et al. | 348/743 |
| 6,621,072 | B2 | * | 9/2003 | Imoto | 250/239 |
| 6,813,557 | B2 | * | 11/2004 | Schmidt et al. | 701/200 |
| 7,253,833 | B2 | * | 8/2007 | Imoto | 348/148 |
| 2003/0007074 | A1 | * | 1/2003 | Nagaoka et al. | 348/148 |
| 2003/0179293 | A1 | * | 9/2003 | Oizumi | 348/148 |
| 2005/0083405 | A1 | * | 4/2005 | Imoto et al. | 348/148 |

FOREIGN PATENT DOCUMENTS

| DE | 197 21 915 C1 | 12/1998 |
|---|---|---|
| DE | 198 01 884 A 1 | 7/1999 |
| EP | 1 004 916 A1 | 5/2000 |
| EP | 1 148 461 A2 | 10/2001 |
| JP | A 7-285379 | 10/1995 |
| JP | A 2000-89301 | 3/2000 |
| JP | A 2003-143596 | 5/2003 |

* cited by examiner

Primary Examiner—Tuan V Ho
Assistant Examiner—Kent Wang
(74) Attorney, Agent, or Firm—Oliff & Berridge, PLC

(57) ABSTRACT

In a camera unit, with respect to a relationship between an image height of respective image portion on an image formed on the pickup element and an image angle of the light lays made incident into the respective image portions, the lens system is configured so that an amount of change in the image height with respect to a change in the image angle is greater at a peripheral portion of the image than at a center part of the image. The lens system further includes an anomorphic lens system which enlarges in the vertical direction the image formed on the pickup element.

9 Claims, 12 Drawing Sheets

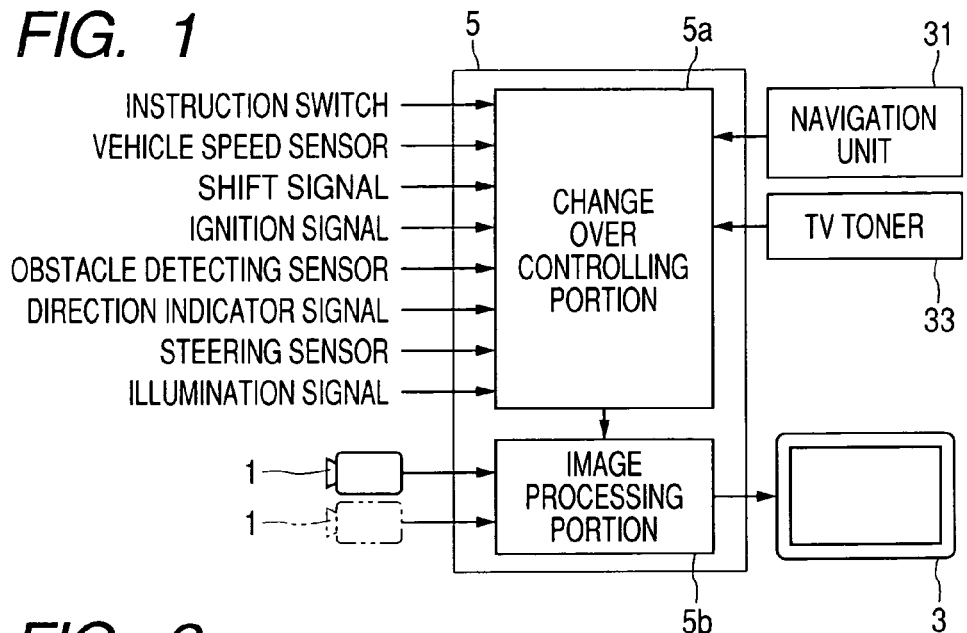
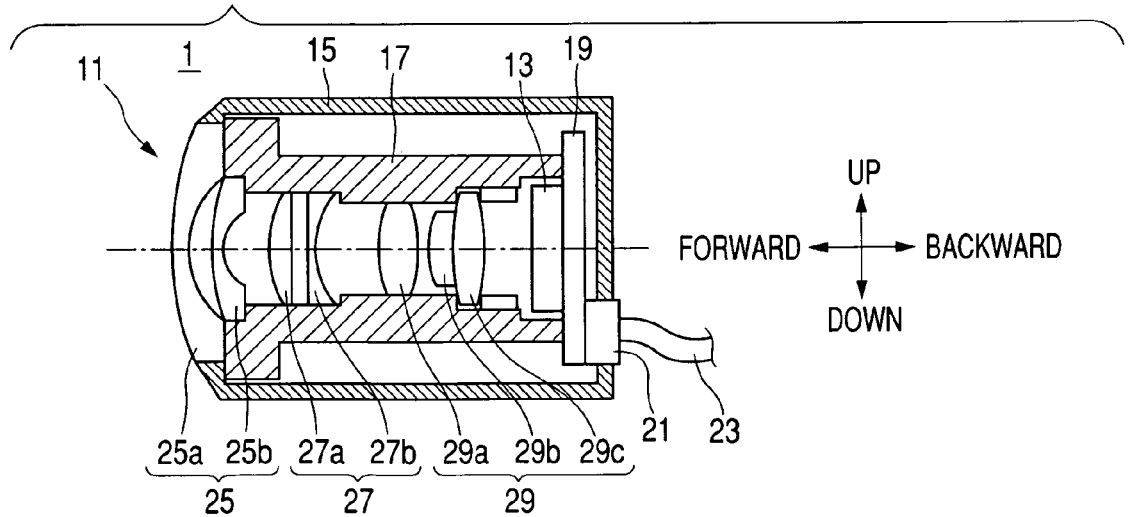
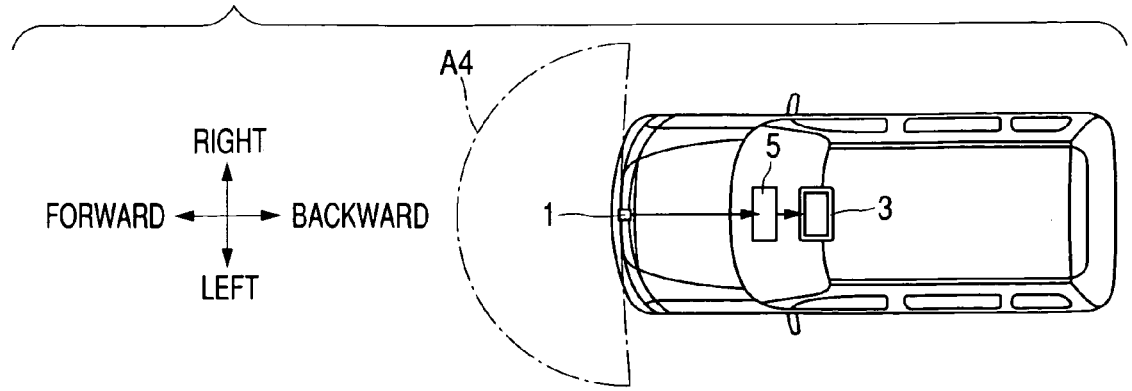

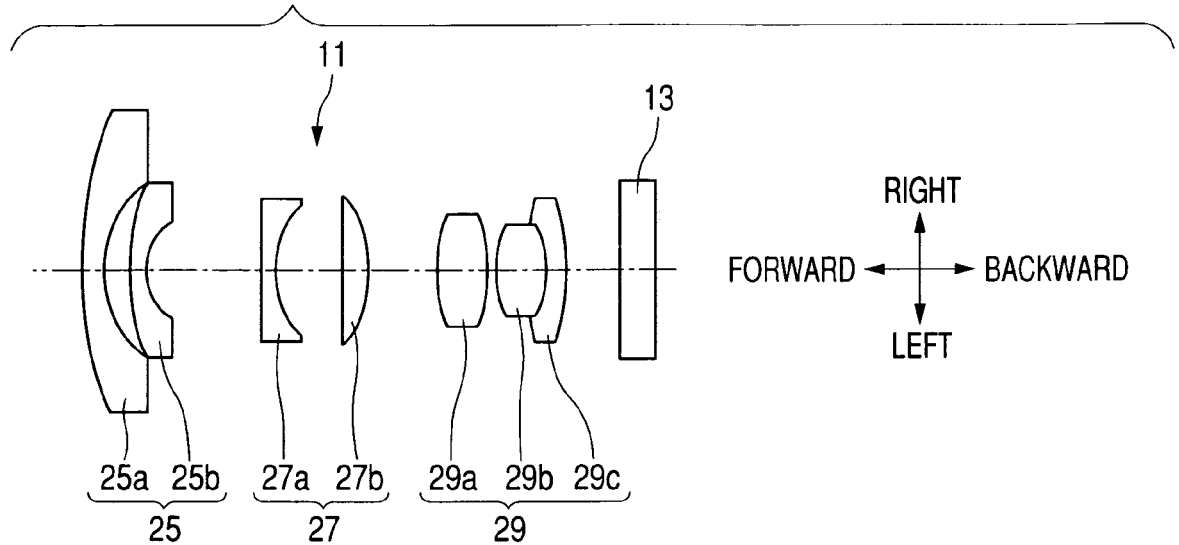
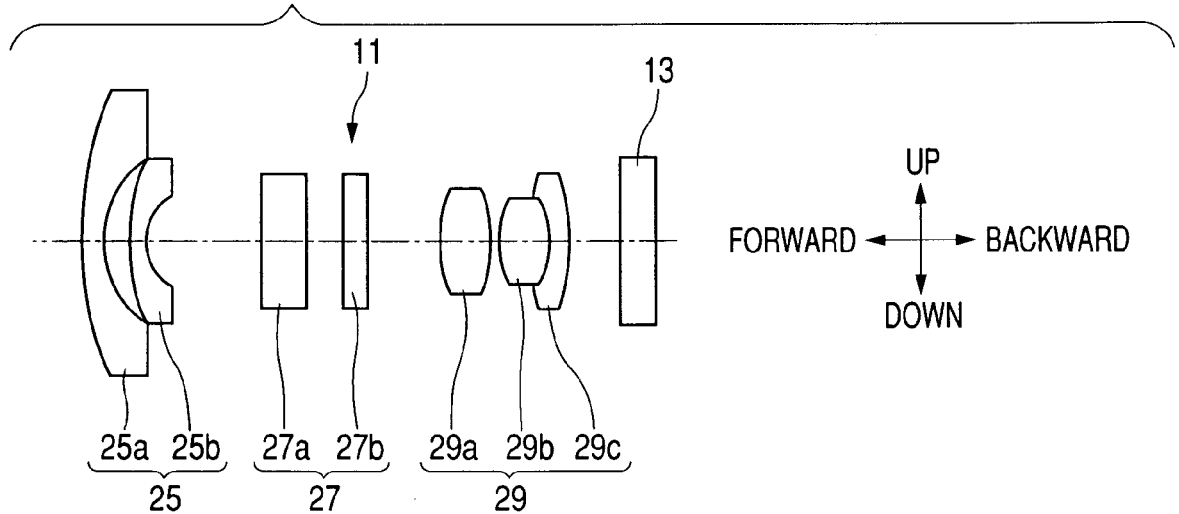
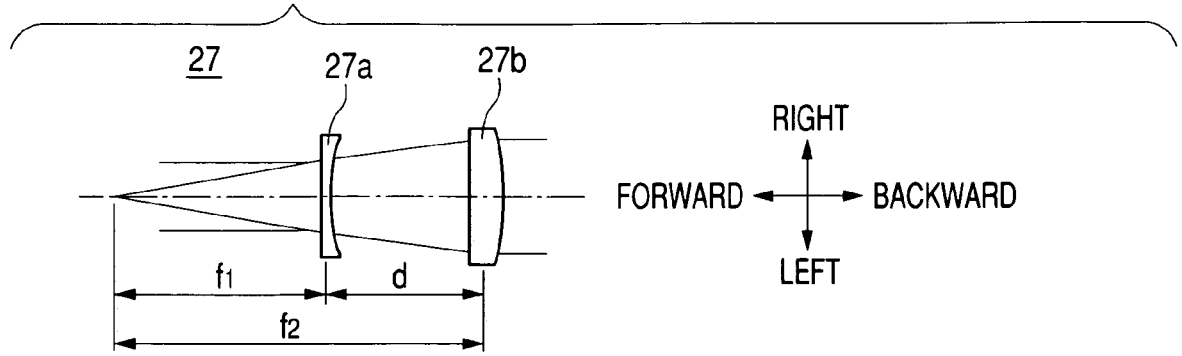

CAMERA UNIT AND APPARATUS FOR MONITORING VEHICLE PERIPHERY

BACKGROUND OF THE INVENTION

1. Field of the Invention

The present invention relates to a camera unit and an apparatus for monitoring a vehicle periphery.

2. Description of the Related Art

For uses in a vehicle and monitoring, it is highly recommended that a wider range of visual field can be picked up by a single camera. In this case, there are many cases where it is desired that the visual field range is wider in the vertical direction than in the horizontal direction.

A camera unit having a prism at the front side of its camera and devised to pick up images in three directions are available (JP-A-2000-89301). By installing the camera unit at the front end part of a vehicle, visual field ranges A1 and A2 in the left and right directions forward of the vehicle and a diagonally downward visual field range A3 forward thereof can be simultaneously picked up as shown in FIG. 34 and FIG. 35.

An apparatus for visually confirming the rearward of the vehicle in which the rearward of the vehicle can be picked up by a camera unit using a fisheye lens is available (JP-A-7-285379).

A monitoring apparatus for a vehicle, which picks up a wide range of the periphery of a vehicle using a fisheye lens, acts and brings down a part of the picked-up image by image processing, enlarges and displays the same in a display unit is available (JP-A-2003-143596).

In JP-A-2000-89301, as shown in FIG. 34, since the visual fields A1 through A3 are limited to partial ranges in the left and right directions forward of the vehicle and a partial range diagonally downward of the front part of the vehicle, dead angle ranges B1 and B2 which are not picked up are brought about forward of the vehicle.

In JP-A-7-285379, since the visual field is simply enlarged by using a fisheye lens although the visual field is enlarged by the fisheye lens and the dead angle ranges rearward of the vehicle are reduced to be narrow, distortion in the picked-up image is increased, for example, as in the part C1 surrounded by a hypothetical line in FIG. 36, wherein visual confirmation is lowered. Also, for example, as in the part C2 surrounded by a hypothetical line in FIG. 36, an object is picked up to be small, and it becomes a cause of a lowering in visual confirmation. Further, for example, as in the part C3 surrounded by a hypothetical line in FIG. 36, the semi-celestial sphere is picked up by a fisheye lens, wherein unnecessary light rays such as sunlight, streetlights, etc., are apt to be picked up by a pickup element, the brightness adjustment of a camera fails (that is, if a bright object is taken, the camera aperture is adjusted to become dark). In addition, a ghost image, flare, etc., occur due to the unnecessary light, wherein visual confirmation of images is further worsened.

Further, in JP-A-2003-143596, since the number of pixels of the camera is limited, the image is made coarse if it is enlarged by an image process, visual confirmation is lowered. That is, the resolution power of a picked-up image is determined by the number of scanning lines of NTSC. In particular, image deterioration due to an enlargement process is more remarkable in the vertical direction than in the horizontal direction. Also, in a normal fisheye lens, a picked-up image is taken to be smaller in the peripheral portions than at the central portion due to distortion, wherein if the peripheral portions of the picked-up image are enlarged, the image deterioration becomes particularly remarkable.

SUMMARY OF THE INVENTION

It is an object of the invention to provide a camera unit and an apparatus for monitoring a vehicle periphery, which are capable of picking up a wide range of visual field while adequately adjusting the visual fields in the horizontal and vertical directions, and at the same time, attempting to improve visual confirmation of images displayed.

According to one aspect of the invention, a camera unit including: a pickup element; and a lens system in which light rays from a prescribed range of a visual field is imaged onto the pickup element, wherein with respect to a relationship between an image height of respective image portion on an image formed on the pickup element and an image angle of the light lays made incident into the respective image portions, the lens system is configured so that an amount of change in the image height with respect to a change in the image angle is greater at a peripheral portion of the image than at a center part of the image.

According to another aspect of the invention, the lens system is configured so that an image height Y of respective image portions shifted from an image center of the image formed on the pickup element into a horizontal direction and an image angle $\theta$ of light rays made incident into the respective image portions meets the relationship of $$Y < f\theta,$$

where a focal distance of the lens system in the horizontal direction is f.

According to another aspect of the invention, the lens system is configured so that an image height Y of respective image portions shifted from an image center of the image formed on the pickup element into a horizontal direction and an image angle $\theta$ of light rays made incident into the respective image portions meets the relationship of $$Y < 2f\tan(\theta/2),$$

where a focal distance of the lens system in the horizontal direction is f.

According to another aspect of the invention, the lens system is configured so that an image height Y of respective image portions shifted from an image center of the image formed on the pickup element into a horizontal direction and an image angle $\theta$ of light rays made incident into the respective image portions meets the relationship of $$Y = pf\tan(\theta/p),$$

using a parameter p of $1 < p < 4$ where a focal distance of the lens system in the horizontal direction is f.

According to another aspect of the invention, the parameter p is set to be 2.

By thus configuration, since images of objects in the peripheral parts (in particular, peripheral parts in the horizontal direction) of the visual field range can be formed to be large on a pickup element, it is possible to improve visual confirmation of object images in the peripheral parts of the visual field range.

According to another aspect of the invention, in the lens system, the visual field angle in the horizontal direction is 180 degrees or more and 270 degrees of less. By thus configuration, it is possible to pick up a wide range of visual field in the horizontal direction.

According to another aspect of the invention, an apparatus which monitors a vehicle periphery, installed in a vehicle including: the camera unit described-above, which picks up the peripheries of the vehicle; and a display unit which displays an image picked up by the camera unit.

By thus configuration, an image picked up in a wide range of visual field in the peripheral part of a vehicle can be acquired with satisfactory visual confirmation, and can be displayed, it is possible to satisfactorily monitor the periphery of a vehicle.

According to another aspect of the invention, a camera unit including: a pickup element; and a lens system in which light rays incoming from a prescribed range of visual field onto the pickup element are imaged; the lens system including; a wide-angle lens system whose visual field angle in the horizontal direction is 120 degrees or more; and an anamorphic lens system whose anamorphic ratio is 1.5 or more.

According to another aspect of the invention, the visual field angle in the horizontal direction is 180 degrees or more and 270 degrees or less. By thus configuration, it is possible to pick up a wider range of visual field in the horizontal direction.

According to another aspect of the invention, with respect to a relationship between an image height of respective image portion on an image formed on the pickup element and an image angle of the light lays made incident into the respective image portions, the lens system is configured so that an amount of change in the image height with respect to a change in the image angle is greater at a peripheral portion of the image than at a center part of the image.

According to another aspect of the invention, the lens system is configured so that an image height Y of the respective image portions deviated from an image center in the image formed on the pickup element in the horizontal direction and an image angle θ of the light rays made incident into the respective image portions meet a relationship of $Y = pf \cdot \tan(\theta/p)$, using a parameter p of 1.p.4, where a focal distance of the lens system in the horizontal direction is assumed to be f. According to another aspect of the invention, the parameter p is set to be 2.

The image of an object in the periphery (in particular, the periphery in the horizontal direction) of the range of visual field can be formed to be large on the pickup element, wherein visual confirmation of object images in the periphery of the range of visual field can be improved.

According to another aspect of the invention, the anamorphic lens system contracts in the horizontal direction the image formed on the pickup element.

According to another aspect of the invention, the anamorphic lens system enlarges in the vertical direction the image formed on the pickup element.

According to another aspect of the invention, an optical the of the lens system is eccentric in a vertical direction with respect to a center of the pickup element. By thus configuration, it is possible to vary the pickup direction of the pickup camera in the vertical direction by adjusting the eccentric amount thereof, wherein the range of visual field of the camera unit can be set to an adequate direction with the optical axis of the lens system held in a fixed direction (for example, the horizontal direction). For example, it is possible to easily adjust the ratio of the portion of the sky contained in the range of visual field.

According to another aspect of the invention, an apparatus monitoring a vehicle periphery, which is incorporated in a vehicle including: the camera unit according to claim 1 which picks up the vehicle periphery; a display unit which displays an image picked up by the camera unit; an image processing portion which carries out at least one image process with respect to at least one part of an image picked up by the camera unit, and which displays the at least one part of the image, and which simultaneously synthesizes a prescribed overlapping image, and which overlaps the prescribed overlapping image onto the picked up image after carrying the at least one image process; and a changeover controlling unit which controls display timing on which the picked up image of the camera unit is displayed on the display unit, and which selects a display range to be displayed in the display unit in a field range of the camera unit, and which selects a content of the at least one image process on the basis of at least one signal. The picked-up image in a wide range of visual field in the periphery of the vehicle can be obtained with satisfactory visual confirmation and can be displayed. Therefore, the periphery of a vehicle can be satisfactorily monitored.

According to another aspect of the invention, an optical axis of the lens system of the camera unit is inclined to a ground surface side with respect to the horizontal direction. By thus configuration, it is possible to prevent the ratio of the portion of the sky from becoming unnecessarily large in the visual field range of the camera unit.

since the lens system is configured by combining a wide-angle lens system, whose visual field angle in the horizontal direction is 120 degrees or more, and an anamorphic lens system, whose anamorphic ratio is 1.5 or more, with each other, it is possible to pick up a wide range of visual field while adequately adjusting the visual field angles in the horizontal and vertical directions, and to attempt to improve visual confirmation of an image displayed. For example, where unnecessary portions are contained in the peripheral portion (for example, the portion where upward sky is taken) in the visual field range of a wide-angle lens system, pickup can be carried out with the unnecessary portions cut off from an image formed on the pickup element by adjusting the anamorphic ratio (for example, by enlarging the image in the vertical direction) of the anamorphic lens system. Thereby, an effective portion (for example, portions in which roads, buildings, etc., are taken) of the visual field of the wide-angle lens system is an image in a large size on the pickup element, and pixels of the pickup element can be effectively utilized to improve the image quality.

In addition, various displays can be carried out, for example, an image of a partial range of the visual field range of a camera unit can be enlarged and displayed in a display unit.

Further, the display timing, etc., of a picked-up image of the camera unit can be adequately controlled in compliance with the situation of the vehicle.

According to another aspect of the invention, an apparatus which monitors a vehicle periphery, which is installed in a vehicle, including: a camera unit described-above, which picks up the vehicle periphery; a display unit which displays an image picked up by the camera unit; a changeover controlling portion which changes over a plurality of display modes with respect to a display pattern to display the image picked up by the camera unit in the display unit; and an image processing portion which carries out at least one of the image processes including enlargement, contraction, movement, rotation and deformation with respect to an image of at least one partial portion of the picked up image in at least one of the display modes in the changeover controlling portion. Since an image is displayed in a display unit while changing over a plurality of display modes. By thus configuration, it is possible to display an image picked up in a wide range of visual field in the periphery of a vehicle with an optimal visual confirmation in compliance with vehicle situations, and it is possible to better monitor the periphery of the vehicle.

According to another aspect of the invention, since the display modes include a normal display mode which sets so that the image picked up by the camera unit, which is not subjected to any image process by the image processing portion, is displayed in the display unit. In particular, the visual field angle in the horizontal direction of the lens system is 180 degrees or more, it is possible to simultaneously display objects not only in the central direction in the visual field angle but also in the left and right directions.

According to another aspect of the invention, since the second display mode of a plurality of display modes is a display mode for enlarging a part including the central part of an image picked up by the camera unit by the image processing portion, it is possible to better display an image, with which a sense of distance can be easily grasped, in the display unit than in a case where the picked-up image is displayed as it is.

According to another aspect of the invention, since the display modes includes a multi-direction image synthesizing display mode which enlarges at least one of left and right parts of the image picked up by the camera unit by the image processing portion, and which displays the at least one of left and right parts of the image by overlapping and synthesizing the at least one of left and right parts of the image on a prescribed partial area of the image of the display unit. It can be greatly improved by enlarging and displaying objects in the left and right directions.

According to another aspect of the invention, since the multi-direction image synthesizing display mode displays at least one of an image picked up by the camera unit, which is not subjected to any of the image processes in the image processing portion, and the image which is obtained by enlarging a part including a central part of the picked-up image by the image processing unit, by overlapping and synthesizing only on partial area. At least the central part and the left/right direction can be enlarged and displayed on one screen of the display unit, wherein visual confirmation can be greatly improved.

According to another aspect of the invention, since the apparatus is provided with an operating element which changes over at least one of the plurality of display modes. It is possible to freely change over the display modes on the basis of the driver's own discretion, and it is very convenient.

According to another aspect of the invention, the changeover controlling portion controls a display timing of displaying the image picked up by the camera unit in the display unit, the changeover controlling portion selects a displaying range in which the image picked up by the camera unit is to be displayed in the display unit, and the changeover controlling portion selects a content of the at least one of the display processes which are carried out with respect to the picked up image by the image processing portion, on the basis of at least one signal. Therefore, it is possible to adequately control the display timing of an image picked up by the camera unit in compliance with the vehicle situations.

According to another aspect of the invention, since the image processing portion displays, in the display unit, prescribed vehicle information including at least one of information regarding a vehicle width, advancing course, and a distance by synthesizing as an overlapping picture. It is possible to integrally support a driver with respect to parking and reverse on the basis of not only surrounding images of a vehicle but also one's own vehicle information.

According to another aspect of the invention, the changeover controlling portion selects the multi-direction image synthesizing display mode, when it is judged on the basis of the vehicle speed signal that the vehicle is driven at a low speed which is a prescribed speed or less and the shift position signal is changed over to a signal indicating reverse of vehicle in low speed drive. Therefore, it is possible to simultaneously display images in multiple directions including the rearward left and right directions on one screen of the display unit when slowly reversing or parking while reversing, and it is convenient.

According to another aspect of the invention, since the changeover controlling portion selects the normal display mode, when it is detected that a shift position signal is changed over to a signal indicating reverse of the vehicle after starting an engine. It is possible to display an image in a wide range of visual field and without any missing angle in the visual field in the display unit when beginning reverse after parking or stopping (that is, start in the reverse direction), wherein safe reverse start can be carried out.

According to another aspect of the invention, the camera unit may be installed from the front part of a vehicle toward the front central part.

According to another aspect of the invention, the camera unit may be installed from the side part of a vehicle toward the side.

According to another aspect of the invention, the camera unit may be installed at a corner part of a vehicle as in the above-aspect.

According to another aspect of the invention, since the display unit displays the picked up image which is made anamorphic by the image processing portion by the normal display mode, such a process for securing depth perception can be carried out, for example, by curving the central part, wherein an accurate sense of distance can be further sensorially secured to display a picked-up image in the display unit.

BRIEF DESCRIPTION OF THE DRAWINGS

FIG. 1 is a block diagram of an apparatus for monitoring a vehicle periphery according to Embodiment 1 of the invention;

FIG. 2 is a longitudinally sectional view showing a construction of a camera unit equipped in the apparatus for monitoring a vehicle periphery of FIG. 1;

FIG. 3 is a view showing an installation pattern of the camera unit of FIG. 2 in a vehicle;

FIG. 21 is a plan view of a lens system of a camera unit provided in an apparatus for monitoring a vehicle periphery according to Embodiment 5 of the invention;

FIG. 22 is a side elevational view of the lens system of FIG. 20;

FIG. 23 is a view showing a construction of an anamorphic system equipped in the lens system of FIG. 21;

DESCRIPTION OF THE PREFERRED EMBODIMENTS

Embodiment 1

FIG. 1 is a block diagram of an apparatus for monitoring a vehicle periphery according to Embodiment 1 of the present invention, and FIG. 2 is a longitudinally sectional view showing a construction of a camera unit equipped in the apparatus for monitoring a vehicle periphery in FIG. 1. As shown in FIG. 1, the apparatus for monitoring a vehicle periphery is provided with a camera unit 1, a display unit 3 and a controller unit 5. Also, in the present Embodiment, the construction includes a single camera 1. However, as shown with hypothetical lines in FIG. 1, the construction may include two or more camera units.

Figure 4:
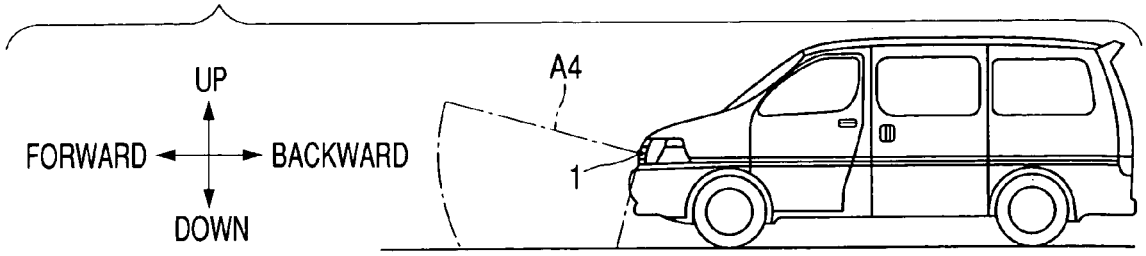
FIG. 4 is a view showing an installation pattern of the camera unit of FIG. 2 in a vehicle.

The camera unit 1 has a construction such as shown in FIG. 2 and is installed at the middle part of the front end portion of a vehicle as shown in FIG. 3 and FIG. 4, wherein the camera unit 1 is devised so that it can pick up a wide range A4 of visual field from the forward front (including a diagonally downward portion forward of a vehicle) of the vehicle to the left and right sides thereof. And, the camera unit 1 is attached to the vehicle body by screws via, for example, a bracket.

As shown in FIG. 2, such a camera unit 1 is provided with a lens system 11, a pickup element 13, and a waterproof case 15 in which the lens system 11 and pickup element 13 are accommodated. The lens system 11 is accommodated in the waterproof case 15 in a state where the entire portion thereof excluding the front end portion thereof is housed in the lens excluding the front end portion thereof is housed in the lens case 17, wherein only the front side part of the lens 25a at the front end portion is exposed to the front side of the waterproof case 15. The pickup element 13 is configured of, for example, CCD, and is installed at the rearward side of the lens system 11 in the waterproof case 15 with the same disposed on a substrate 19. A cable 23 connected by a waterproof connector 21 is used to supply a power source and control signals to the camera unit 1 and to pick up image signals therefrom. The waterproof case 15 is kept waterproof by using an O-ring (not illustrated), whereby interior components of the camera unit 1 can be protected from wind and rain.

The lens system 11 is provided with the first through third lens groups 25, 27 and 29. Hereinafter, one lens group may include at least one lens. The visual field angle H in the horizontal direction of the lens system 11 is set to 180 degrees or more and 270 degrees or less (for example, 190 degrees), and the visual field angle V in the vertical direction is set to, for example, 71 degrees, whereby the ratio of the visual field angle H in the horizontal direction to that of V in the vertical direction, that is, H/V becomes 2.7 (H/V=2.7). Therefore, the visual field angles can adequately correspond to monitoring using images of the peripheries of a vehicle, in which a wider range is required in the horizontal direction than in the vertical direction. In addition, the above-described visual field angles H and V in the horizontal direction and vertical direction are matched to the range of visual field of an image formed on the light receiving plane of the pickup element 13 by the lens system 11.

The first lens group (wide-angle lens system) 25 is configured so as to have two lenses 25a and 25b so that the visual field angle of 120 degrees or more can be brought about, and has negative refractive power. And, it assumes a role as a fisheye conversion lens for converting the visual field range of the third lens group 29, which functions as an imaging system, to a wide angle. Since the first lens group 25 is configured so as to become an afocal system, it emits a parallel light ray while converting its image height if a parallel light ray enters. Herein, the first lens group 25 carries out conversion so that the image height contracts (that is, so that the image angle becomes large).

The second lens group (anamorphic lens system) 27 is provided with two lenses 27a and 27b (herein, cylindrical lenses) disposed at the image side of the first lens group 25 and composes an anamorphic system in which magnifications in the horizontal direction and vertical direction differ from each other, which assumes a role of adjusting the visual field range in length and breadth of the lens system 11. In the present Embodiment, the second lens group 27 entirely has negative refractive power in the vertical direction but does not have any refractive power in the horizontal direction. Here, the second lens group 27 composes an afocal system and is set so that the anamorphic image ratio in length and breadth becomes 1.5 or more (for example, 2.0).

Figure 5:
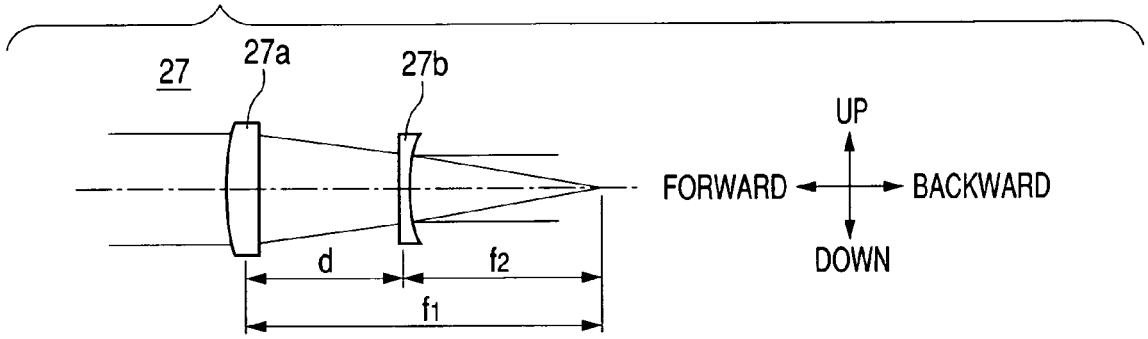
FIG. 5 is a view showing a construction of an anamorphic system equipped in the camera unit of FIG. 2.
Figure 6:
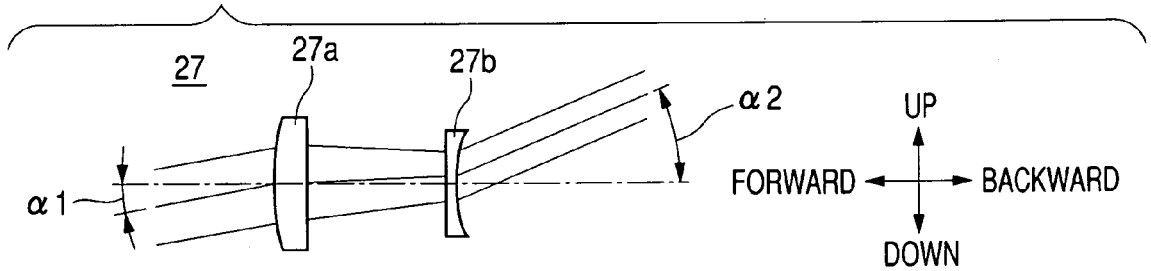
FIG. 6 is a view describing the principle of the anamorphic system of FIG. 5.

In further detail, the second lens group 27 has a Galilei type composition with respect to the vertical direction as shown in FIG. 5, in which the focal distance f1 of the object side lens 27a is set to f1=12.7 [mm], the focal distance f2 of the image side lens 27b is set to f2=−6.35 [mm], and a spacing d between the lenses 27a and 27b is set to d=f1−f2=12.7−6.35=6.35 (in the present expression, f1 and f2 are absolute figures), whereby the magnification r of the afocal system becomes r=f1/f2=2.0. Instill further detail, as shown in FIG. 6, as a light ray enters the second lens group 27 at an incidence angle α1 with respect to the vertical direction, the relationship between the incidence angle 1 of the light ray and emission angle α2 thereof becomes r=tan α2/tan α1=2.0. As a result, the image formed on the pickup element 13 is enlarged two times in the vertical direction by the second lens group 27.

For this reason, the visual field angle V in the vertical direction of the lens system 11 becomes approximately 142 degrees in a case not using the second lens group 27. However, the visual field angle V becomes 71 degrees by contribution of the second lens group 27.

The third lens group (imaging lens system) 29 has three lenses 29a through 29c, which are disposed at the image side of the first and second lens group 25 and 27. Light rays which come from the visual field range A4 via the first and second lens groups 25 and 27 are formed on the light receiving plane of the pickup element 13.

Here, in the present Embodiment, although the first lens group 25 is disposed at the subject side of the second lens group 27, such a construction may be employed, in which the second lens group 27 is disposed at the object side of the first lens group 25 and composes the system 11.

Also, in the lens system 11, as regards the relationship between image heights of respective image portions on an image formed on the pickup element 13 and image angles (incidence angle with respect to the optical axis) of light rays made incident into the respective image portions, it is configured so that the amount of change in the image height with respect to a change in the image angle is made larger at the periphery of the above-described image than at the middle part thereof. Further preferably, it is configured so that, in a state where the second lens group 27 is removed, the image height Y of respective portions of an image formed on the light receiving plane of the pickup element 13 by the lens system 11 and the image angle θ of light rays made incident into the respective portions meet the relationship of Y=pf·tan(θ/p), using a parameter p of 1<P<4 where the focal distance of the lens system 11 is f.

In detail, in the present Embodiment, since the figure of the above-described parameter p is set to 2, and a stereographic projection system is employed, the lens system 11 is configured so that the above-described image height Y and the above-described image angle meet the relationship of Y=2f·tan(θ/2). In the Embodiment, since the second lens group 27 does not have any refractive power with respect to the horizontal direction, the above-described relationship of Y=2f·tan(θ/2) can be maintained with respect to the horizontal direction in the lens system 11 in a state where the second lens group 27 is inserted. That is, as the entire lens system 11, the image height Y of respective image portions deviated from the center of the image formed on the light receiving plane of the pickup element 13 in the horizontal direction and the incidence angle θ with respect to the optical axis of light rays made incident into the respective image portions meet the above-described relationship of Y=2f·tan(θ/2) (however, f is the focal distance of the lens system 11 in the horizontal direction). Therefore, it becomes possible to greatly form an image of an object at the peripheries on the pickup element 13 even in the peripheries in the picked-up visual field A4 in the horizontal direction.

Image signals of an image of the visual field range A4 picked up by the pickup element 13 are transmitted to the controller unit 5 installed at a prescribed position in a vehicle via the cable 23.

The display unit 3 is configured of a liquid crystal display unit, etc., and is installed in a vehicle, and displays an image picked up by the camera unit 1 by controlling the controller unit 5.

The controller unit 5 is configured so as to be provided with a change controller portion 5a and an image processing portion 5b. On the basis of operational inputs of a driver and vehicle situations indicated by various types of input signals, the display timing by which an image picked up by the camera unit 1 is displayed in the display unit 3 is controlled, the display scope to be displayed in the above-described display unit in the visual field range A4 of the camera unit 1 is selected, and the content of image processing to be executed with respect to the above-described picked-up image to be displayed in the display unit is selected. The change controller portion 5a manages the control content of the controller unit 5. The image processing portion 5b carries out an image process subject to the content determined by the change controller portion 5a onto an image picked up by the camera unit 1 and causes the display unit 3 to display the same.

As shown in FIG. 1, the change controller portion 5a controls the display content, etc., of the display unit 3 on the basis of at least one of an operation signal inputted by an instruction switch (not illustrated) for operation, a vehicle speed signal inputted from a vehicle speed sensor (not illustrated), a shift position signal regarding the shift position, an ignition signal for detecting the state of the ignition switch, an obstacle detection signal given from an obstacle detection sensor (not illustrated) in order to detect the presence of any obstacle in the peripheries of a vehicle, a direction indicator signal indicating the operational state of the direction indicator, and a steering rotation angle signal given from a steering sensor (not illustrated) for detecting the rotation angle of steering. The images to be displayed in the display unit 3 include an image picked up by the camera unit 1, an image for navigation of a navigation unit 31, which carries out route guidance to a destination (including images for operating the navigation unit 31), and television images given from a television tuner 33, and it is controlled by the change controlling unit 5a which one among these images is to be displayed in the display unit 3.

In an image process carried out by the image processing portion 5b based on instructions of the change controlling portion 5a, for example, such a process is carried out, in which at least one partial range of the visual field range A4 of the camera unit 1 is cut and brought down, at least one of image processes such as enlargement, contraction, movement, rotation and deformation is carried out with respect to the picked-up image of the part portion, is displayed in the display unit 3, and at the same time, a prescribed overlapping image is synthesized, is overlapped onto a picked-up image after the image process, and is displayed in the display unit 3. Herein, the enlargement and contraction processes enlarge and contract the image size, and the image is displayed in the display unit 3. In the case of enlargement, an interpolation process is carried out in line with the enlargement. The movement process moves the display position of an image in the display unit 3. The rotation process turns the rotation angle on the display screen when displaying an image in the display unit 3. The deformation process is a compensation process for compensating distortion of an image, which is produced by pickup. The distortions to be compensated includes a lens distortion due to characteristics of, for example, the lens system 11. It is considered that the overlapping image includes a mark, etc., showing in which direction an image cut and brought down from the visual field range A4 of the camera unit 1 corresponds in the visual field range A4.

Figure 7:
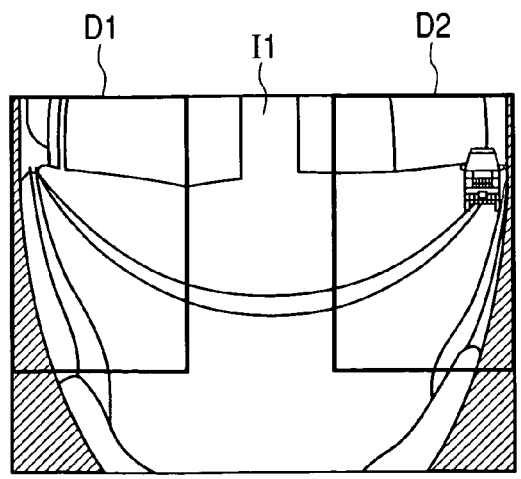
FIG. 7 is a view showing a display example of an image picked up by the apparatus for monitoring a vehicle periphery of FIG. 1, and showing a setting example of a processing range in image processing.

As regards a detailed display example of an image picked up by the camera unit 1, for example, where it is necessary to entirely check a wide range in the forward side of a vehicle, as shown in FIG. 7, an image I1 of the visual field range A4, which is picked up by the camera unit 1, is displayed in the display unit 3.

Figure 8:
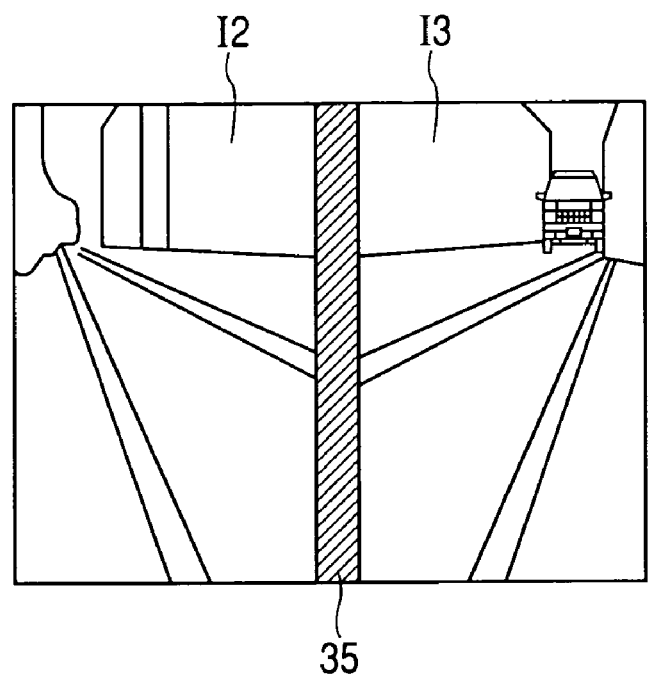
FIG. 8 is a view showing a display example of an image picked up by the apparatus for monitoring a vehicle periphery of FIG. 1.

Also, where it is necessary to check the situations in the left and right directions forward of the vehicle, images in the two cut out ranges (processing range) D1 and D2 corresponding to the left and right directions set in the visual field range A4 in FIG. 3 are cut and brought down, wherein an enlargement process and a lens distortion removing process are carried out with respect to the image thus cut and brought down. As shown in FIG. 8, the processed images I2 and I3 in the left and right directions are displayed in the display unit 3. In the display example in FIG. 8, the images I2 and I3 in the left and right directions are displayed side by side on the screen of the display unit 3. A longitudinally-lined mask image for partitioning is synthesized by the image processing portion 5b and is displayed with a prescribed color (for example, black) between the images I2 and I3. Further, as shown in FIG. 8, where an image of either partial range (for example, cut-out ranges D1 and D2) contained in the visual field range A4 is cut and brought down for display, an overlapping image (not illustrated) to identify to which partial range in the visual field range A4 the image corresponds is synthesized by the image processing portion 5b, overlapped on the corresponding image and displayed. For example, where the images I2 and I3 in the left and right directions are cut, brought down and displayed, a mark, which identifies that the displayed images correspond to the images I2 and I3 in the left and right directions, is overlapped and displayed as an overlapping image.

Figure 9:
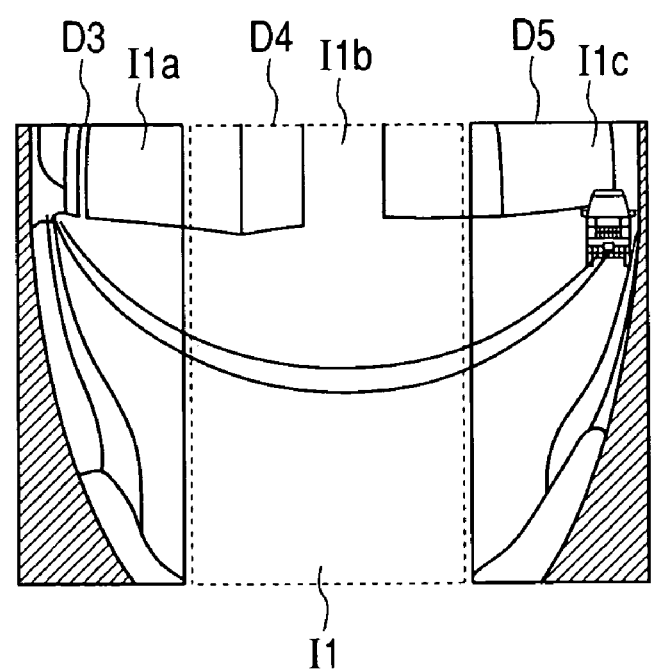
FIG. 9 is a view showing a setting example of a processing range of image processing of a picked-up image by the apparatus for monitoring a vehicle periphery of FIG. 1.
Figure 10:
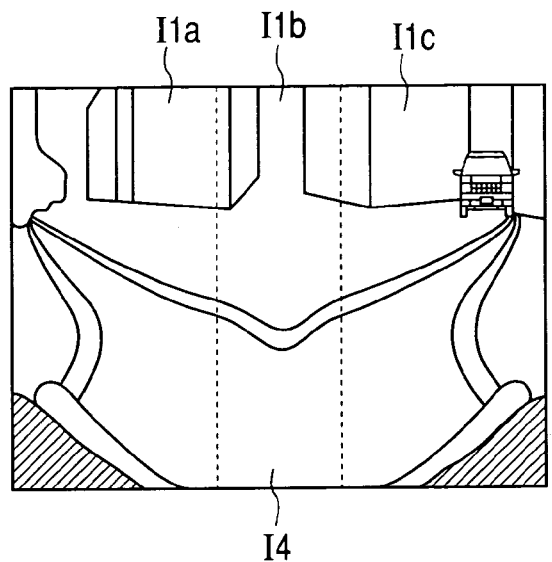
FIG. 10 is a view showing a display example of an image picked up by the apparatus for monitoring a vehicle periphery of FIG. 1.

Further, as another example, as shown in FIG. 9, it is considered that processing ranges D3 through D5 are established in the picked-up image I1 in the visual field range A4, and image processes differing from each other are carried out with respect to the processing ranges D3 through D5 for display. In the example shown in FIG. 9, the visual field range A4 is longitudinally divided into three (left, middle and right) processing portions D3 through D5, and the images I1a and I1c of the left and right processing ranges D3 and D5 are enlarged in the horizontal direction and are compensated to remove the lens distortion. Further, the image I1b of the middle processing range D4 is subjected to a contraction process in the horizontal direction, whereby visual confirmation of the images I1a and I1c of the left and right processing ranges D3 and D5 is improved. With the process, an image I4 as shown in FIG. 10 is displayed in the display unit 3. In the image I4 shown in FIG. 10, the images I1a and I1c of the left and right processing ranges D3 and D5 are enlarged in the horizontal direction, and its visual confirmation is improved.

Next, a description is given of a detailed example of controlling operations of the display content of the display unit 3. For example, in an operation example of starting a vehicle, an ignition signal showing that the ignition switch is turned on is inputted into the change controlling portion 5a. After that, if the shift position is changed to the D (Drive) range, a shift position signal showing a change to the D range is inputted into the change controlling portion 5a. In response to input of the ignition signal and shift position signal, the picked-up image I1 of the visual field range A4 is displayed in the display unit 3 in the display format of the image I4 shown in FIG. 10 on the basis of control of the controller unit 5, so that a dead range diagonally downward of the front side of a vehicle can be confirmed. And, as it is detected on the basis of a vehicle speed signal that the vehicle is started and the vehicle speed reaches a first prescribed speed (for example, 10 km per hour), the display content of the display unit 3 is changed from the picked-up image I1 to a navigation image of the navigation unit 31 on the basis of control of the controller unit 5. Where it is detected on the basis of a vehicle speed signal that during travelling, the vehicle temporarily stops or its vehicle speed is lowered to a second prescribed speed (for example, 10 km per hour or less) of the vehicle speed, the images I2 and I3 of the cut-out ranges D1 and D2 in the left and right directions are displayed in the display unit 3 in the display format shown in FIG. 8 on the basis of control of the controlling unit 5.

As a controlling operation based on a steering rotation angle signal or a direction indicator signal, it is considered that, on the basis of a steering angle signal or a direction indicator signal, left or right turning of a vehicle is detected, and a picked-up image I1 is displayed in the display unit 3 in the display format shown in FIG. 10 in order to check the left and right directions. As a controlling operation based on an obstacle detection signal of the obstacle detecting sensor, for example, where it is detected by the obstacle detecting sensor installed at the front end part of the vehicle (for example, left and right corner parts forward of the vehicle) that an obstacle exists in the periphery of the vehicle, it is considered that a picked-up image I1 is displayed in the display unit 3 in the display format shown in FIG. 10 in order to check the periphery of the vehicle. As a controlling operation based on an illumination signal, it is considered that the display brightness of the display unit 3 is lowered on the basis of an illumination signal at night.

As described above, according to the camera unit 1 based on the present invention, since the lens system 11 is configured by combining the first lens group (wide-angle lens system) 25 whose visual field angle in the horizontal direction is 120 degrees or more and the second lens group (anamorphic lens system) 27 whose anamorphic ratio is 1.5 or more, it is possible to pick up a wide range A4 of visual field while adjusting the visual field angles in the horizontal direction and the vertical direction, and at the same time, its visual confirmation of the displayed images can be improved. For example, where unnecessary portions are included in the peripheral portions (for example, portion in which the upward sky is taken) of the visual field range of the first lens group 25, the unnecessary portions (for example, upper and lower peripheral portions) are removed from an image formed on the pickup element 13 by adjusting the anamorphic ratio of the second lens group 27 (for example, by enlarging the image in the vertical direction, etc.), and its pickup can be carried out. Therefore, effective portions (for example, portions in which roads and buildings are taken) of the visual field range of the first lens group 25 are formed in a large image size on the pickup element 13, wherein pixels of the pickup element 13 can be effectively utilized, and the image quality can be improved.

In addition, with the camera unit 1, since the visual field angle in the horizontal direction is set to 190 degrees, it is possible to pick up a wide range A4 of visual field in the horizontal direction.

Further, with the camera unit 1, since the first and second lens groups 25 and 27 are made into an afocal system, the first and second lens groups 25 and 27 can be combined to the existing image-forming lens system, wherein it is possible to easily compose the lens system 11.

Still further, with the camera unit 1, since the lens system 11 is configured so that it meets the above-described relationship of $Y=2f \cdot \tan(\theta/2)$ with respect to the horizontal direction, it is possible for images of objects in the peripheral portions to be formed in large sizes on the pickup element 13 even in the peripheral portions in the horizontal direction in the pickup visual field A4. Resultantly, visual confirmation of object images in the peripheral portions in the horizontal direction of the visual field range A4 can be further improved.

In addition, since an apparatus for monitoring a vehicle periphery according to the Embodiment employs a camera unit 1 as described above, a pickup image of a wide visual field range A4 in the vehicle periphery (that is, forward of the vehicle in the present Embodiment) can be acquired and displayed with a satisfactory visual confirmation, wherein it is possible to better carry out monitoring of the vehicle periphery.

Also, various types of display can be carried out in compliance with the situations of a vehicle, wherein a pick-up image I1 of the camera unit 1 is partially cut and brought down, and is displayed in the display format shown in FIG. 8, or is partially contracted or enlarged, and displayed in the display format shown in FIG. 10.

It is possible to adequately control the display timing, etc., of images picked up by the camera unit 1 in the display unit 3 in compliance with the situations of a vehicle.

Also, as a modified version of the present Embodiment, the first lens group 25 may omitted in the construction of the lens system 11 of the camera unit 1.

Embodiment 2

Figure 11:
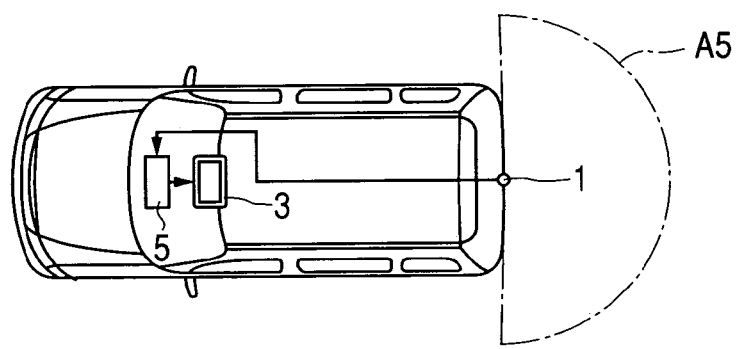
FIG. 11 is a view showing an installation pattern of a camera unit in an apparatus for monitoring a vehicle periphery according to Embodiment 2 of the invention.
Figure 12:
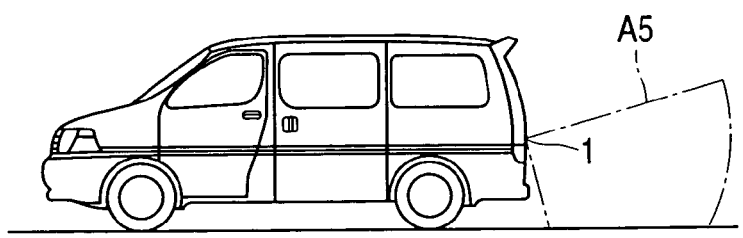
FIG. 12 is a view showing an installation pattern of a camera unit in an apparatus for monitoring a vehicle periphery according to Embodiment 2 of the invention.

FIG. 11 and FIG. 12 are views showing installation patterns of a camera unit in an apparatus for monitoring a vehicle periphery according to Embodiment 2 of the invention. In the present Embodiment, as shown in FIG. 11 and FIG. 12, a camera unit 1 whose construction is almost identical to that of the camera unit 1 according to Embodiment 1 is installed at the middle part at the rear portion of a vehicle, and is devised so that a wide visual field range A5 from the rear side backward of a vehicle (which includes a diagonally downward portion backward of the vehicle) to the left and right sides. The other construction is almost identical to that of Embodiment 1, and a description thereof is omitted herein.

As an example for controlling changeover of the display content of the display unit 3, for example, when it is detected by the controlling unit 5 based on a shift-position signal that the shift position is moved to R (Reverse), the display content of the display unit 3 is changed over from a navigation image and television image to an image picked up by the camera unit 1 for conformation of the rear side of a vehicle. At this time, the image picked up by the camera unit 1 is inverted and processed with respect to the left and right side by the image processing unit 5b in order to match the rear side image taken in the room mirror, and is displayed in the display unit 3.

Therefore, in the present Embodiment, such an effect can be brought about, by which it is possible to pick up and display an image in a wide range A5 of visual field in the rear side of the vehicle with its visual confirmation improved, and it is possible to prevent a collision with an obstacle in the rear side of a vehicle.

Embodiment 3

Figure 13:
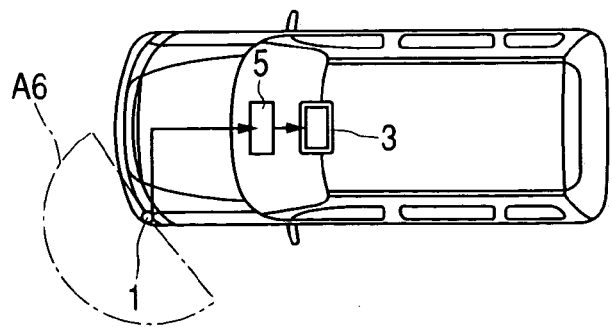
FIG. 13 is a view showing an installation pattern of a camera unit in an apparatus for monitoring a vehicle periphery according to Embodiment 3 of the invention.
Figure 14:
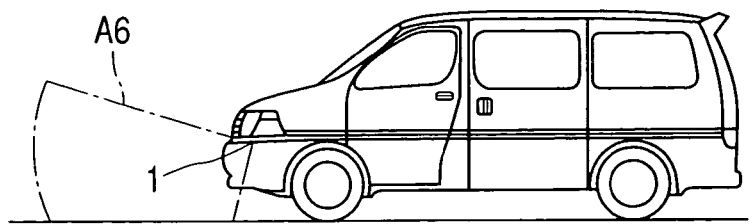
FIG. 14 is a view showing an installation pattern of a camera unit in an apparatus for monitoring a vehicle periphery according to Embodiment 3 of the invention.

FIG. 13 and FIG. 14 are views showing installation patterns of a camera unit in an apparatus for monitoring a vehicle periphery according to Embodiment 3 of the invention. In the present Embodiment, as shown in FIG. 13 and FIG. 14, a camera unit the construction of which is almost identical to that of the camera unit 1 according to Embodiment 1 is installed at a corner part of a vehicle (in the present Embodiment, at the left side corner portion at the front side of a vehicle (for example, at the corner of a bumper)) and is devised so that it can pick up a wide range A6 of visual field at the periphery of the corner portion. Other construction is almost identical to that of Embodiment 1, and description thereof is omitted herein.

Figure 15:
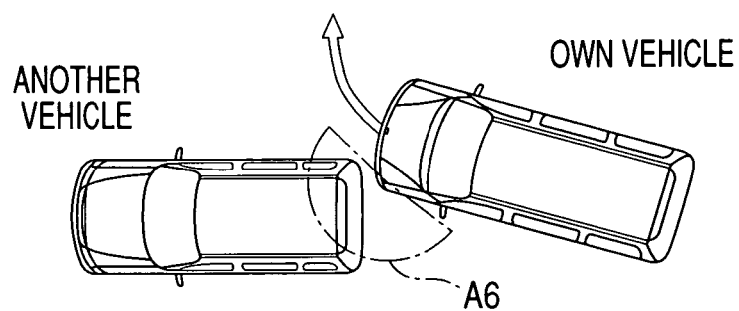
FIG. 15 is an exemplary view showing a situation when the periphery of a vehicle is monitored by the apparatus for monitoring a vehicle periphery of FIG. 13.
Figure 16:
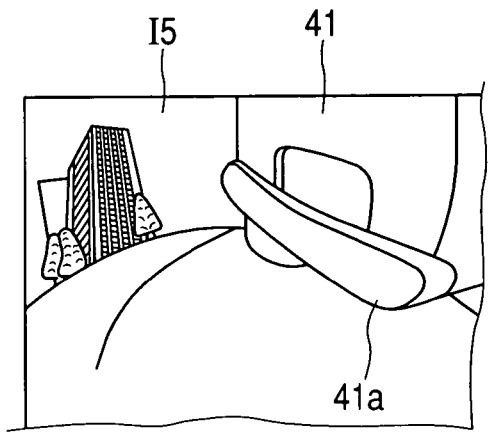
FIG. 16 is a view partially showing an image picked up by the apparatus for monitoring a vehicle periphery of FIG. 13.

As an example of controlling changeover of the display content of the display unit 3, for example, where it is detected by an obstacle detecting signal from an obstacle detecting sensor (not illustrated) installed at the left side corner portion in the front end part of a vehicle that an obstacle exists in the periphery of the left corner portion, for confirmation of the periphery at the left corner portion, the display content of the display unit 3 is changed over from a navigation image and a television image to an image picked up by the camera unit 1 by controlling the controlling unit 5. For example, as shown in FIG. 15, where the distance from the left side corner portion forward of the vehicle to the other vehicle is reduced less than a fixed distance when passing alongside the rear part or the side of the other vehicle, this is detected by the obstacle detecting sensor and is notified to the controlling unit 5, wherein the display content of the display unit 3 is changed to an image I5 picked up by the camera unit 1 as shown in FIG. 16. Further, FIG. 16 shows only a part of the picked-up image I5 of the camera unit 1, and reference number 41 of FIG. 16 indicates an image of another vehicle to which the vehicle approaches, and reference number 41a is an image of the rear part bumper of the vehicle.

Changeover of the display content in such a display unit 3 can be manually carried out by an instruction switch (not illustrated).

Therefore, in the present Embodiment, it is possible to pick up and display an image of a wider range A6 of visual field in the periphery at the corner (in the present Embodiment, the left side corner portion at the forward end part of the vehicle) of a vehicle while attempting to improve visual confirmation, wherein such an effect can be employed, by which it is possible to prevent a collision with obstacles in the periphery of a vehicle.

Embodiment 4

Figure 17:
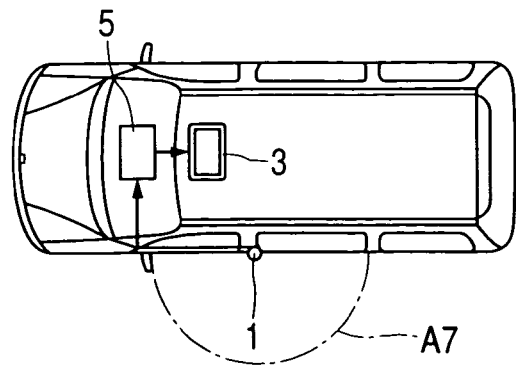
FIG. 17 is a view showing an installation pattern of a camera unit in an apparatus for monitoring a vehicle periphery according to Embodiment 4 of the invention.
Figure 18:
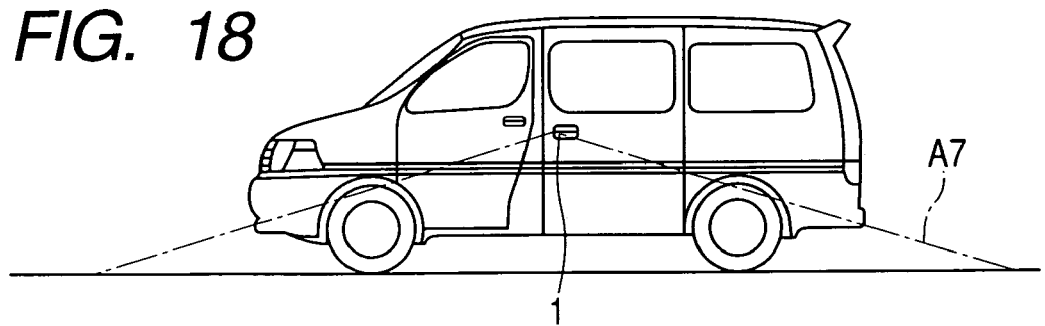
FIG. 18 is a view showing an installation pattern of a camera unit in an apparatus for monitoring a vehicle periphery according to Embodiment 4 of the invention.

FIG. 17 and FIG. 18 are views showing installation patterns of the camera unit in an apparatus for monitoring a vehicle periphery according to Embodiment 4 of the invention. In the present Embodiment, as shown in FIG. 17 and FIG. 18, a camera unit 1, the construction of which is almost identical to that of the camera unit 1 according to Embodiment 1 is installed sideward of a vehicle (in the present Embodiment, at the middle part in the longitudinal direction at the left side of a vehicle (for example, a door handle portion)), and is devised so that it can pick up a wide range A7 of visual field sideward of the vehicle. Other construction is almost identical to that of Embodiment 1, and description thereof is omitted herein.

Figure 19:
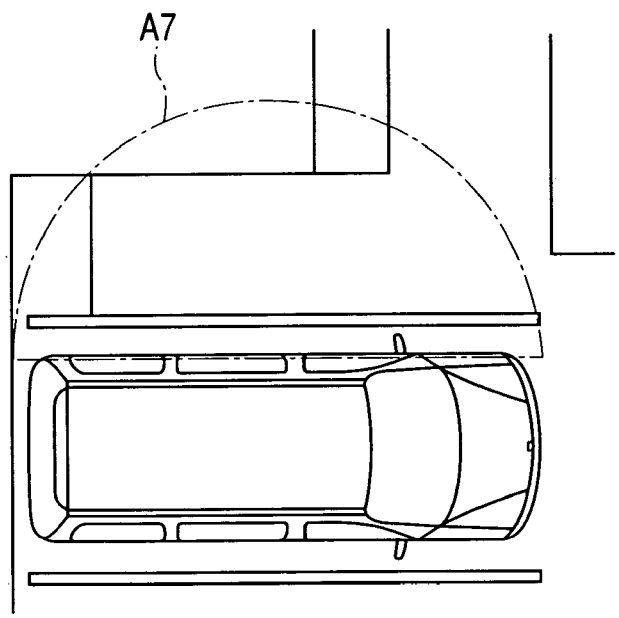
FIG. 19 is an exemplary view showing a situation when the periphery of a vehicle is monitored by the apparatus for monitoring a vehicle periphery of FIG. 17.
Figure 20:
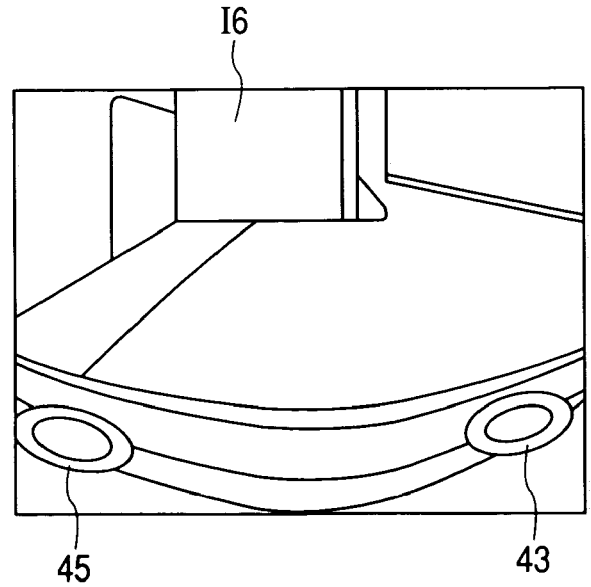
FIG. 20 is a view showing an image picked up by the apparatus for monitoring a vehicle periphery of FIG. 17.

In the present Embodiment, if the situations of the periphery of a vehicle is such a situation as shown in FIG. 19 (that is, a situation where the vehicle parks in a parking area) since the camera unit 1 is provided in the left sideward portion of a vehicle, an image I6 as shown in FIG. 20 is picked up by the camera unit 1 and is displayed in the display unit 3. Also, reference number 43 in FIG. 20 indicates an image of the front side tire of the vehicle, and reference number 45 indicates an image of the rear side tire thereof.

As an example for controlling changeover of the display content of the display unit 3, for example, changeover control responsive to an operational input from an instruction switch (not illustrated) and changeover control responsive to an obstacle detecting signal from the obstacle detecting sensor (not illustrated) are considered.

Accordingly, in the present Embodiment, a wide range A7 of visual field is picked up in the periphery of the sideward of a vehicle (in the present Embodiment, the left sideward of the vehicle) while attempting to improve visual confirmation, and can be displayed in the display unit, wherein such an effect can be brought about, by which it is possible to prevent a wheel from coming off and the vehicle from being brought into contact with any obstacle.

Embodiment 5

FIG. 21 and FIG. 22 are a plan view and a side view of the lens system of a camera unit equipped in an apparatus for monitoring a vehicle periphery according to Embodiment 5 of the present invention. A point in which the apparatus for monitoring a vehicle periphery according to the present invention is substantially different from the apparatus for monitoring a vehicle periphery according to Embodiment 1 is only the construction of the lens system 11 of the camera unit 1, wherein parts which correspond to each other are given the same reference numbers, and description thereof is omitted.

In the present Embodiment, as shown in FIG. 21 and FIG. 22, the second lens group 27 that composes the lens system 11 composes an anamorphic system having positive refractive power in the horizontal direction but not having any refractive power in the vertical direction. In addition, in the present Embodiment, the second lens group 27 composes an afocal system, wherein the anamorphic ratio of the length and breadth is set to, for example, 1.5 or more (for example, 2.0).

Figure 24:
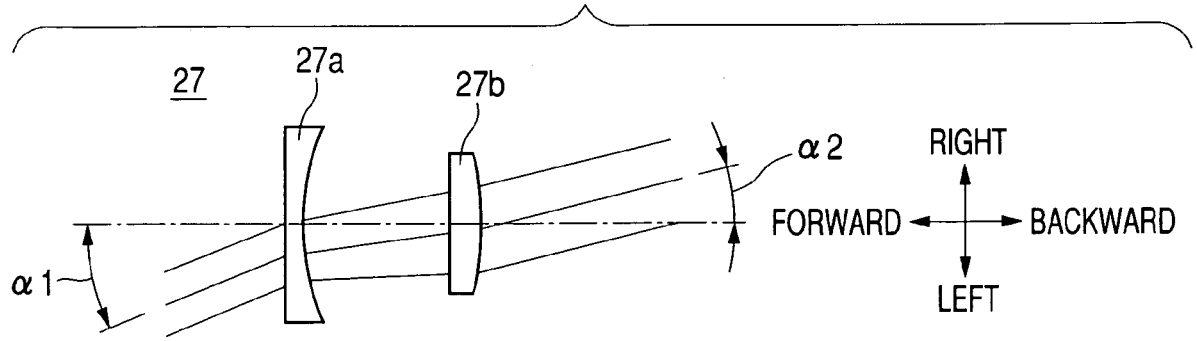
FIG. 24 is a view describing the principle of the anamorphic system of FIG. 23.

In further detail, the second lens group 27 according to the present Embodiment has an inverted Galilei type with respect to the horizontal direction as shown in FIG. 23, wherein the focal distance f1 of the object side lens 27a is set to f1<0, the focal distance f2 of the image side lens 27b is set to f2>0, the interval d between the lenses 27a and 27b is set to d=f2−f1>0 (in the present expression, f1 and f2 are absolute figures), wherein the magnification r of the afocal system becomes r=f1/f2>1. With further description, as shown in FIG. 24, if a light ray is made incident into the second lens group 27 at an incidence angle α1 with respect to the horizontal direction, the relationship between the incidence angle α1 of the light ray and the emission angle α2 becomes r=tan α2/tan α1<1. As a result, the image formed on the pickup element 13 is contracted in the horizontal direction by the second lens group 27.

For this reason, the visual field angle H in the horizontal direction of the lens system 11 is enlarged in comparison with a case where the second lens group 27 is not used.

A lens group which is identical to the first lens group 25 according to the above described Embodiment 1 may be used as the first lens group 25. However, since the visual field angle H in the horizontal direction is enlarged by the second lens group in the present Embodiment, a lens group whose wide-angle conversion magnification is smaller than that of the first lens group 25 according to Embodiment 1 may be employed. A lens group which is identical to the third lens group 29 according to the above-described Embodiment 1 may be employed as the third lens group 29.

Therefore, in the present Embodiment, a display image of a wide range of visual field can be acquired, adequately corresponding to the areas in the horizontal direction and vertical direction, which are required as the visual field range, and visual confirmation of the display image can be improved. That is, effects almost identical to those of the above-described Embodiment 1 can be brought about.

Embodiment 6

Figure 25:
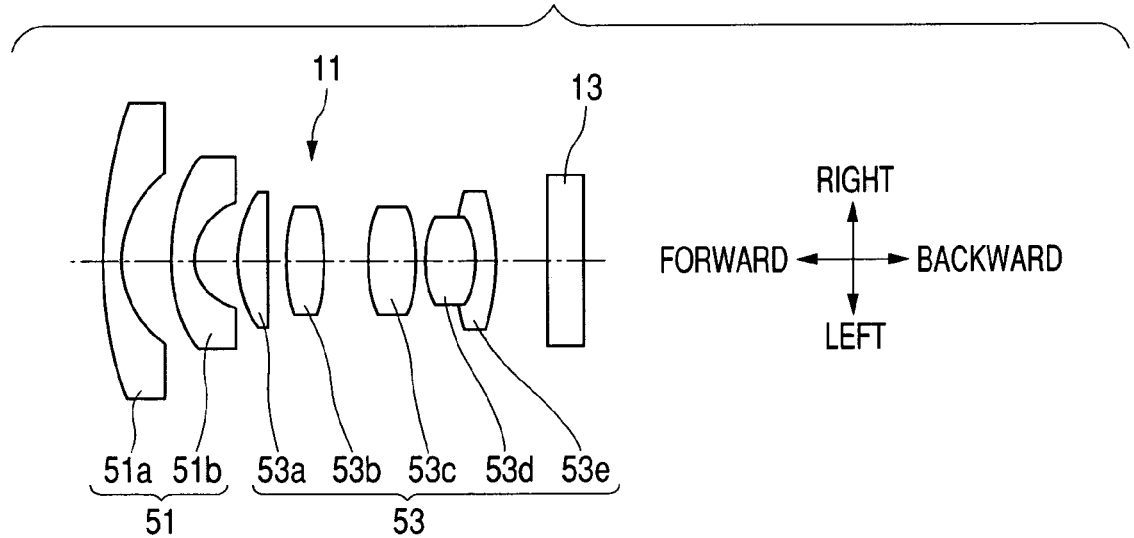
FIG. 25 is a plan view showing a lens system of a camera unit equipped in an apparatus for monitoring a vehicle periphery according to Embodiment 6 of the invention.
Figure 26:
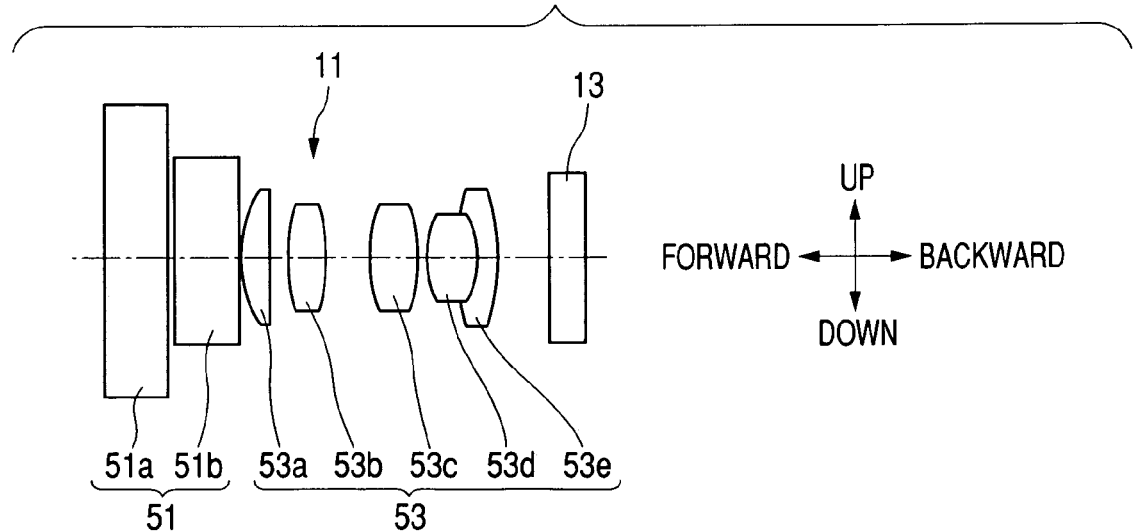
FIG. 26 is a side elevational view of the lens system of FIG. 25.

FIG. 25 and FIG. 26 are a plan view and a side view of a lens system of a camera unit equipped in an apparatus for monitoring a vehicle periphery according to Embodiment 6 of the invention. A point in which the apparatus for monitoring a vehicle periphery according to the present invention is substantially different from the apparatus for monitoring a vehicle periphery according to Embodiment 1 is only the construction of the lens system 11 of the camera unit 1, wherein parts which correspond to each other are given the same reference numbers, and description thereof is omitted.

In the present Embodiment, the lens system 11 of the camera unit 1 is provided with the first and second lens groups 51 and 53 as shown in FIG. 25 and FIG. 26.

The first lens group (anamorphic lens system) 51 is provided with two lenses (herein, cylindrical lenses) 51a and 51b disposed at the extreme front portion of the lens system 11, and composes an anamorphic system in which magnification in the vertical direction differs from that in the horizontal direction. In the Embodiment, the first lens group 51 is configured so as to entirely have negative refractive power in the horizontal direction but not to have any refractive power in the vertical direction, wherein the anamorphic ratio with respect to the length and breadth is set to 1.5 or more.

The second lens group 53 functions as an image-forming lens system, and is provided with five lenses 53a through 53e which are disposed at the image side of the first lens group 51. The second lens group 53 forms light rays from the visual field range, which enter via the first lens group 51, on the light receiving plane of the pickup element 13.

With such a construction, the visual field angle V in the vertical direction remains unchanged while the visual field angle H in the horizontal direction is enlarged by functioning of the first lens group 51, wherein it becomes possible to pick up a wide range of visual field in the horizontal direction by the camera unit 1.

Therefore, also in the present Embodiment, a display image of a wide range of visual field can be acquired, adequately corresponding to the areas in the horizontal direction and vertical direction, which are required for the visual field range, and at the same time, improvement of visual confirmation of the display image is attempted, wherein effects almost identical to those of the above-described Embodiment 1 can be obtained.

Embodiment 7

Figure 27:
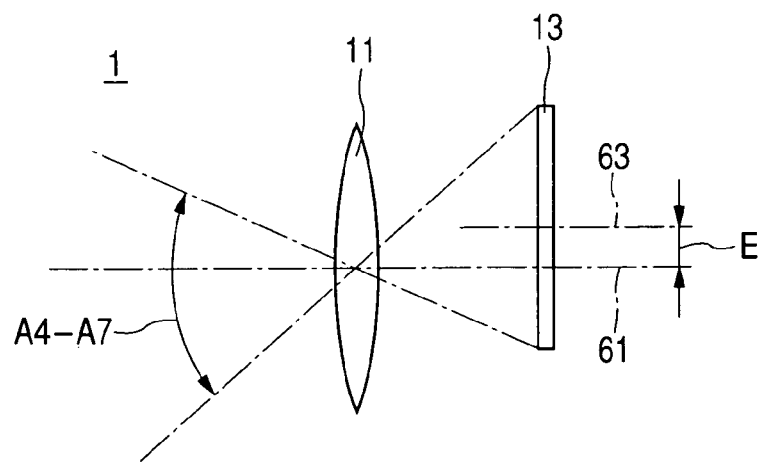
FIG. 27 is an exemplary view showing a construction of a camera unit equipped in an apparatus for monitoring a vehicle periphery according to Embodiment 7 of the invention.

FIG. 27 is an exemplary view showing a construction of a camera unit equipped in an apparatus for monitoring a vehicle periphery according to Embodiment 7 of the invention. A point in which the apparatus for monitoring a vehicle periphery according to the above-described Embodiment 7 is substantially different from the apparatus for monitoring a vehicle periphery according to any one of Embodiment 1 through Embodiment 6 exists only in disposing relationship between the lens system 11 in the camera unit 1 and the pickup element 13, and parts which correspond to each other are given the same reference numbers, and description thereof is omitted. In addition, FIG. 27 shows a simplified construction of the lens system 11, etc.

In the camera unit 1 according to the present Embodiment, the optical axis 61 of the lens system 11 is shifted by a prescribed eccentricity dimension E in the vertical direction (for example, in the downward direction) with respect to the center normal line 63 passing through the center of the pickup element 13. Also, the optical axis 61 is kept parallel to the center normal line 63. In addition, images of the respective visual field ranges A4 through A7 are formed on the pickup element 13 upside down.

Accordingly, the pickup direction of the camera unit 1 changes in the vertical direction with respect to the optical axis 61 of the lens system 11. For example, in the construction example shown in FIG. 27, the optical axis 61 of the lens system 11 is shifted downward with respect to the center normal line 63 of the pickup element 13, whereby the pickup direction of the camera unit 1 is turned diagonally downward with respect to the optical axis 61 of the lens system 11. As a result, for example, the pickup direction is set to be turned diagonally downward with respect to the horizontal direction in a state where the optical axis 61 of the lens system 11 is kept parallel to the horizontal direction.

Therefore, in the present Embodiment, a display image of a wide range of visual field can be acquired, adequately corresponding to the areas in the horizontal direction and vertical direction, which are required for the visual field range, and at the same time, improvement of visual confirmation of the display image is attempted, wherein effects almost identical to those of the above-described Embodiment 1 through Embodiment 6 can be obtained. At the same time, the following effects can be also obtained.

That is, by adjusting the above-described eccentricity dimension E of the lens system 11 of the camera unit 11 with respect to the pickup element 13, it is possible to vary the pickup direction of the camera unit 1 in the vertical direction, whereby it is possible to set the visual field ranges A4 through A7 of the camera unit 1 to an adequate direction in a state where the optical axis 61 of the lens system 11 is kept in a fixed direction (for example, in the horizontal direction). For example, it is possible to easily adjust the ratio of the sky portion contained in the visual field ranges A4 through A7.

In addition, instead of making the optical axis 61 of the lens system 11 eccentric with respect to the pickup element 13 (or adding to a construction in which the optical axis 61 is made eccentric), such a construction may be employed as a modified version of the present Embodiment, in which the optical axis 61 of the lens system 11 of the camera unit 1 is inclined by a prescribed angle toward the ground surface with respect to the horizontal direction, and the pickup direction of the pickup camera 1 is turned diagonally downward with respect to the horizontal direction.

Embodiment 8

An apparatus for monitoring a vehicle periphery according to Embodiment 8 of the invention is constructed so that the first display mode (normal display mode) for providing a video image having no dead angle in a wide range by using a super-wide angle lens system 11 such as a fisheye lens, etc., the second display mode (enlargement display mode) for enlarging and displaying a video image in a necessary range in a prescribed scene where a sense of distance is required when parking in a garage or parking in the longitudinal direction, and the third display mode (multi-direction image synthesizing display mode) can be changed over. In addition, in the present embodiment, parts which have almost functions similar to those of the above-described respective embodiments are given the same reference numbers.

The apparatus for monitoring a vehicle periphery is provided with a camera unit 1, a display unit 3 and a controlling unit 5 as in Embodiment 1 shown in FIG. 1.

Among these, the camera unit 1 is fixed roughly at the middle of the rear part, in detail, for example, in the grille of the middle part of the rear end part of a vehicle by screws via, for example, a bracket (not illustrated) as in Embodiment 2 shown in, for example, FIG. 11, whereby a wide range of visual field from the surface at the rear part in the rear side of a vehicle to the left and right directions can be picked up.

Figure 28:
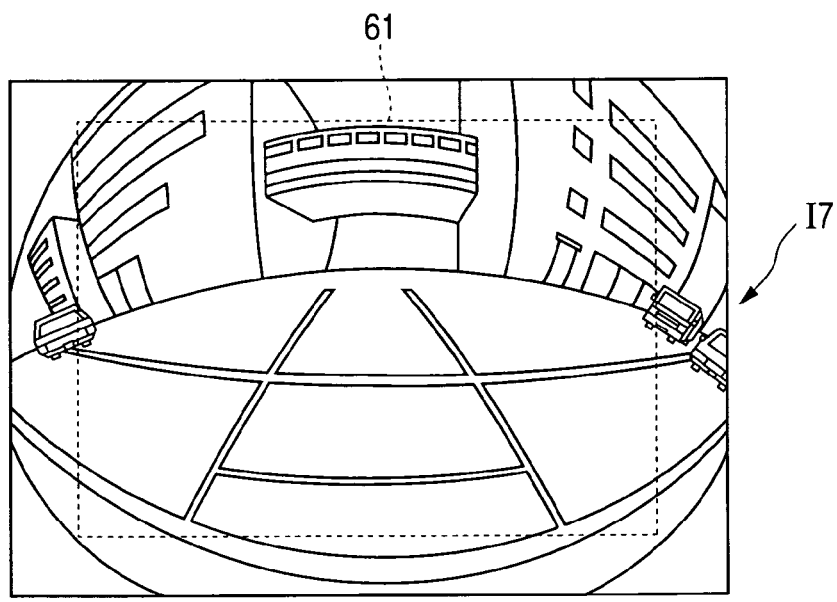
FIG. 28 is a view showing a range of pickup by a camera unit of an apparatus for monitoring a vehicle periphery according to Embodiment 8 of the invention.

And, the camera unit 1 is configured as in Embodiment 1 as shown in, for example, FIG. 2, the visual field angle H in the horizontal direction of the lens system 11 is set to 180 degrees or more (for example, 190 degrees), and an optical system having a greater amount of information on the peripheral portions than that of a general fisheye lens is employed, whereby the camera unit 1 can simultaneously pick up both a video image in the left and right sides at the rear side of a vehicle and a video image of the lower side at the rear part of the vehicle in a single image 17 as shown in FIG. 28, and a mode in which an image picked up by the camera unit 1 is displayed in the display unit 3 as it is in the first display mode.

The entirety of the camera unit 1 is accommodated in a waterproof case 15 sealed by an O-ring (not illustrated) in order to protect the camera unit 1 from rain and wind, and only the front side part of the lens 25a of the front end portion is exposed to the front side of the waterproof case 15.

For example, in the lens system 11, the image height Y of respective parts of an image formed on the light-receiving plane of the pickup element 13 and an image angle θ of a light ray made incident into the respective parts are configured so as to meet the relationship of $Y = pf \cdot \tan(\theta/p)$, using a parameter p of 1<p<4 where the focal distance of the lens system 11 is f, and where the above-described parameter p is set to, for example, 2, and a cubic projection method is employed, the lens system 11 is configured so that the above-described image height Y and image angle θ meet the relationship of Y=2f·tan(θ/2). Thereby, an object in the periphery in the horizontal direction is greatly formed on the pickup element 13, wherein visual confirmation of an object approaching from sideward can be improved.

The peripheral image formed on the pickup element 13 surface is transmitted to the image processing portion 5b of the controlling unit 5 and is subjected to image processing.

And, in the above-described second display mode, a part 61 including the central portion of the image 17 as shown in FIG. 28, which is obtained by a pickup unit, is cut out and brought down by the image processing unit 5b of the controlling unit 5, and at the same time, for example, the central portion in the image frame is partially enlarged, whereby a sense of distance can be further easily grasped with respect to an image obtained by the lens system 11 being a fisheye lens while interpolating the pixels thereof. An image 18 which is a display example by the second display mode is shown in FIG. 29.

Figure 29:
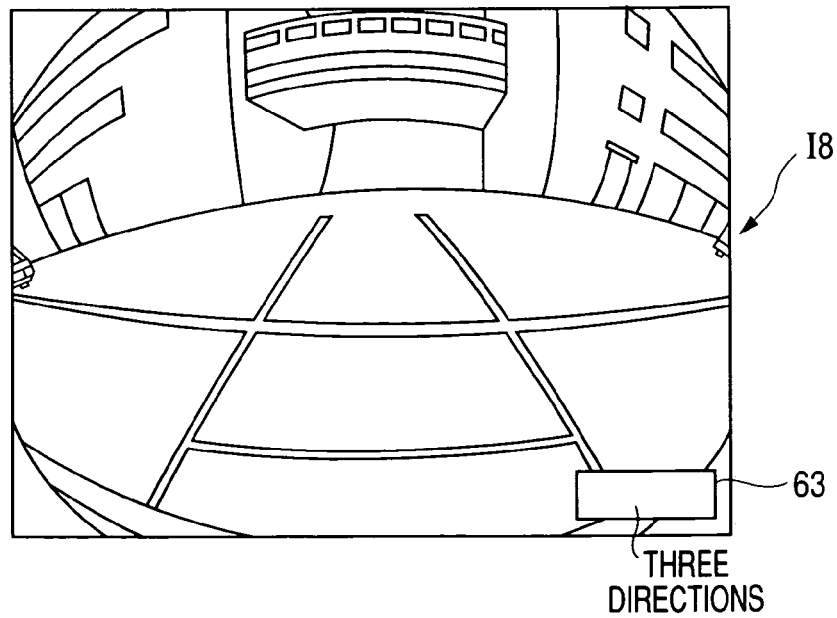
FIG. 29 is a view showing a display example of a picked-up image in the first display mode by an apparatus for monitoring a vehicle periphery according to Embodiment 8 of the invention.
Figure 30:
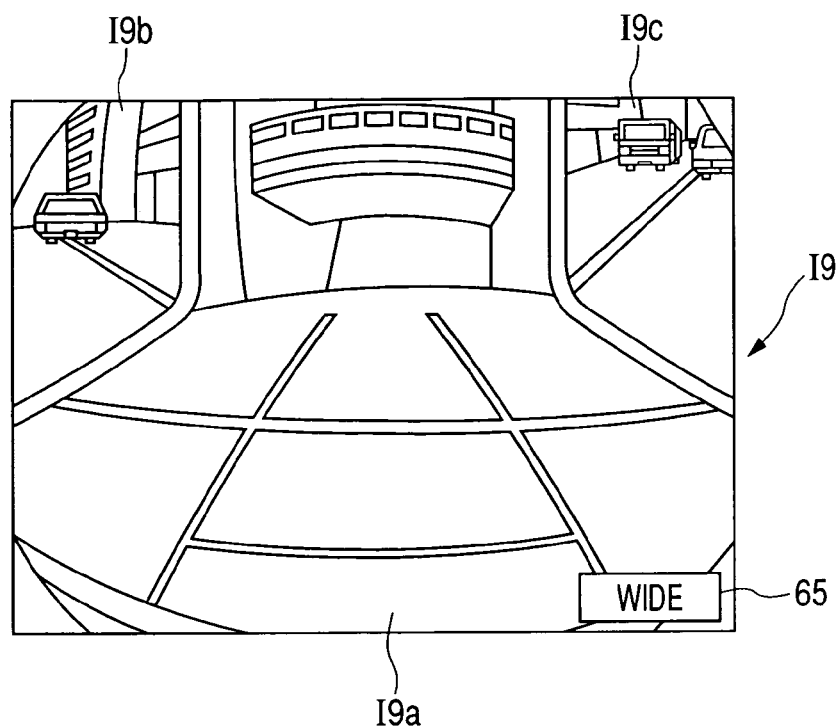
FIG. 30 is a view showing a display example of a picked-up image in the second display mode and the third display mode by an apparatus for monitoring a vehicle periphery according to Embodiment 8 of the invention.

Further, the third display mode displays not only an enlarged image of the rear part of a vehicle as in the second display mode of FIG. 29 but also images (that is, left and right images at the rearward of a vehicle) I9b and I9c at the left and right ends in an image obtained by the lens system 11 as shown in FIG. 30 while overlapping the same on the left and right upper parts of the image I9a as in the image of the second display mode of FIG. 29, whereby a driver is urged to pay attention to an object approaching from dead angles in the left and right rear parts of the vehicle. At this time, the images I9b and I9c at the left and right ends of the image obtained by the lens system 11 are not displayed, as they are, at a prescribed area of the display unit 3, but are enlarged while interpolating the pixels thereof, and at the same time, the coordinates thereof are converted so that the actual coordinates in the vertical direction of an object picked up in the images 19b and 19c correspond with the coordinates in the vertical direction in the display unit 3. Enlargement of these images I9b and I9c and coordinate conversion thereof are carried out by the image processing portion 5b of the controlling unit 5.

The first display mode and the second display mode or the third display mode are changed over by the change over controlling portion 5a of the controlling unit 5 shown in FIG. 1. That is, as shown in FIG. 1, the changeover controlling portion 5a controls the display content of the display unit 3 on the basis of at least one of an operation signal inputted from an instruction switch (not illustrated) for operation, a vehicle speed signal inputted from a vehicle speed sensor, a shift position signal regarding the shift position, an ignition signal to detect the status of the ignition switch, an obstacle detecting signal given by an obstacle detecting sensor (not illustrated) for detecting the existence of an obstacle in the periphery of a vehicle, a direction indicating signal showing the actuation status of direction indicators, and a steering rotation angle signal given from a steering sensor for detecting the rotation angle of steering.

For example, as an example in a case where a vehicle parked with its front side forward in a garage where it is difficult for its driver to directly and visually confirm the left and right sides at the rearward of the vehicle, when the ignition signal is inputted, and thereafter the shift position signal is changed from a signal indicating parking to a signal indicating the R (reverse) range, an image including the dead angle images in the entirety of the rearward periphery of the vehicle, which is picked up by the camera unit 1, is displayed by the first display mode in the display unit 3. Thereby, when the driver commences reverse after parking and stopping (that is, starts reversing), an image showing the rearward of a vehicle, which is picked up in a wide range of visual field and covers a full range without any missing angle in the visual field, can be displayed in the display unit. For example, since it is possible to confirm other vehicles and pedestrians approaching one's own vehicle, safer reversing can be carried out.

Also, where it is judged on the basis of a vehicle speed signal whether or not the vehicle runs at a lower speed (including forward and reverse) than a prescribed speed and the shift position signal is changed to R(Reverse) when in low speed running, it is judged that the vehicle is in attempt to be parked or reversed, wherein an enlarged image to which image processing is given to easily grasp a sense of distance is displayed as in the second display mode (FIG. 29), and not only an enlarged image of the rearward of a vehicle but also left and right images I9b and I9c of the rearward, to which an image process is given, are simultaneously displayed as in the third display mode (FIG. 30), and a driver is urged to pay attention to an object approaching from left and right dead angles of the rearward portion.

Thus, since the display contents of the display unit 3 are controlled on the basis of at least one of an operation signal from instruction switches, speed signal from a vehicle speed sensor, shift position signal regarding the shift position, ignition signal, obstacle detecting signal from the obstacle detecting sensor, direction indicator signal and steering rotation angle signal from the steering sensor, it is possible to adequately change over the display in the display unit 3 automatically in response to various situations of a vehicle. And, it is convenient.

Here, the second display mode and the third display mode are changed over by a prescribed operation carried out by a driver. For example, a one-touch type display unit is provided as the display unit 3, wherein when a changeover icon displayed at one part (for example, right lower part) of respective images I8 and I9 is touched and pressed, one display mode is changed to another display mode. In detail, an icon 63 for changeover to the third display mode, in which, for example, "3 directions" is described, is displayed in the screen of the second display mode (FIG. 29), and an icon 65 for changeover to the second display mode, in which, for example, "wide" is described, is displayed in the screen of the third display mode, wherein when the changeover icon 63 or 65 in the respective display mode of the second and third display modes is operated by touching, the display mode is changed to another display mode. Thus, where a touch-panel type display unit is employed as the display unit 3, it can be set that the display modes are changed over by touching the screen of the display unit 3. However, if such a touch-panel type display unit is not employed as the display unit 3, a changeover switch (not illustrated) is provided near the display unit 3, by which the second display mode and the third display mode may be changed over by operating the changeover switch. By using prescribed operating elements such as changeover icons or changeover switch, it is possible to easily change over the display mode in the display unit 3 in accordance with the necessity of a driver, etc.

Such a construction may be employed, by which one's own vehicle information such as vehicle width, advancing course, distance, etc., are overlapped and synthesized in the screen as character information and are displayed in addition to images I7, I8 and I9 obtained by the camera unit 1 as images displayed in the display unit 3, whereby it is possible to integrally support a driver in terms of parking and reversing along with the character information.

Other construction is almost identical to that of Embodiment 1, and description thereof is omitted.

Also, in the present-embodiment, since a fisheye lens in which the visual field angle in the horizontal direction of the lens system 11 is 180 degrees or more is employed, not only can a wide range of visual field in the horizontal direction be picked up in the first display mode, but also rearward left and right images I9b and I9c can be picked up without any hindrance in the third display mode.

In addition, since, in the second display mode and the third display mode, images I8 and I9 (I9a, I9b and I9c) of necessary portions are enlarged by the image processing portion 5b of the controlling unit 5 and are displayed in the display unit 3, it is possible to form images of objects in a large size on the pickup element while carrying out various types of display, wherein a sense of distance can be easily understood. In particular, in the third display mode, since not only an image I9a directly behind a vehicle but also rearward left and right images I9b and I9c can be enlarged and displayed, these modes can be effectively utilized in terms of parking a vehicle in a garage or parking longitudinally in a line.

Also, since the display contents of the display unit 3 are controlled on the basis of at least one of an operation signal from instruction switches, speed signal from a vehicle speed sensor, shift position signal regarding the shift position, ignition signal, obstacle detecting signal from the obstacle detecting sensor, direction indicator signal and steering rotation angle signal from the steering sensor, it is possible to adequately change over the display in the display unit 3 automatically in response to various situations of a vehicle. And, it is convenient.

In particular, not only the entirety of the rearward of a vehicle is normally displayed in the first display mode if it is detected that the shift position is changed to R (Reverse) immediately after the engine starts, but also a prescribed scope is cut out and brought down from a visual field, and is enlarged, rotated, and interpolated when the shift position signal is turned into a signal indicating R (Reverse) when parking or reversing, and an image I8 enlarged in the second display mode is displayed, and images I9a, I9b and I9c in the three directions are simultaneously displayed in the third display mode. Therefore, it is possible to automatically display the images I7, I8 and I9 that a driver can easily visually confirm in accordance with the vehicle situations.

In addition, since the display modes (the second display mode and the third display mode) can be optionally changed over by operating the changeover icons displayed in the display unit 3 or changeover switch disposed around the display unit 3, it is possible to easily changeover the display modes in the display unit 3 in accordance with the necessity of a driver, etc.

Further, since one's own vehicle information such as vehicle width, advancing course and distance, etc., are overlapped and synthesized in the screen as character information, and is displayed in the display unit 3, it becomes possible to integrally support a driver in terms of parking and reversing on the basis of not only the images I7, I8 and I9 but also the character information.

Still further, in Embodiment 8, the camera unit 1 is installed roughly at the middle of the rearward and picks up a wide range A5 of visual field from the rear front side in the rearward of a vehicle to the left/right directions. In addition thereto, the camera unit 1 may be installed roughly at the middle of the front part, sideward of a vehicle or at the corner portion thereof. Further, in Embodiment 1 through Embodiment 7, the camera unit 1 may be installed at any position at which the periphery of a vehicle can be picked up.

Also, in Embodiment 8, images I9a, I9b and I9c in the three directions are overlapped and synthesized in the display unit 3 as the third display mode (multi-direction image synthesizing display mode). However, there is no problem even if a plurality of images in two or four or more directions are overlapped, synthesized and displayed therein.

In addition, in the third display mode (multi-direction image synthesizing display mode) of Embodiment 8, the rearward left and right images I9b and I9c are overlapped and synthesized in the enlarged image I9a and are displayed in the display unit 3. However, the left and right end side images I9b and I9c may be overlapped and synthesized in the image I7 (FIG. 28) which is picked up by the pickup unit and may be displayed in the display unit 3 without any processing.

Embodiment 9

In the above-described respective embodiments, objects in the periphery in the visual field are displayed to be larger than in a general fisheye lens. However, in this case, contrarily, distortion of objects at the middle part is slight, and a driver feels that those objects are farther than in actuality, wherein it is difficult to grasp an accurate sense of distance.

Therefore, in an apparatus for monitoring a vehicle periphery according to Embodiment 9, an image picked up by the camera unit 1 is made anamorphic so that the middle part of the image is enlarged by the image processing portion 5b of the controlling unit 5, and the same is normally displayed in the display unit 3, or the anamorphic image thus picked up is overlapped and synthesized on a part area, and is displayed therein.

Figure 31:
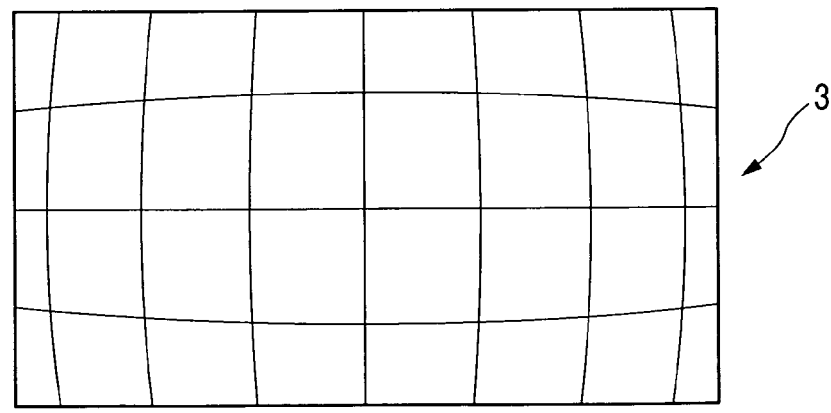
FIG. 31 is a view showing an example of a picked-up image of an apparatus for monitoring a vehicle periphery according to Embodiment 9 of the invention.
Figure 32:
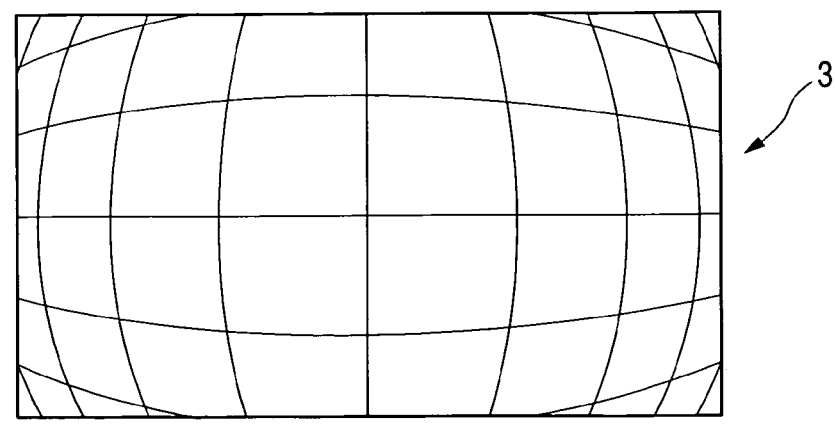
FIG. 32 is a view showing an image which is made anamorphic by an image processing portion of an apparatus for monitoring a vehicle periphery according to Embodiment 9 of the invention.

For example, where it is assumed that the image shown in FIG. 31 is an image picked up by the camera unit 1, the image made anamorphic by the image processing portion 5b of the controlling unit 5 becomes as shown in FIG. 32. In FIG. 32, the middle part is enlarged larger than the peripheral parts. Thus, since the middle part is made anamorphic so as to be enlarged, the distance to an object can be easily grasped when looking at the display unit 3. Furthermore, it is more convenient to make the middle part anamorphic than to merely enlarge the middle part and display the same because a driver can have a sense of approaching an object taken in the middle part. That is, by carrying out a process to bring about a perspective sense by, for example, curving the middle part, a picked-up image can be displayed in the display unit 3 while more sensorially grasping the distance.

Embodiment 10

In an apparatus for monitoring a vehicle periphery according to Embodiment 10 of the present invention, the construction of the lens system 11 is almost identical to that of the apparatus for monitoring a vehicle periphery according to the above-described Embodiment 1 through Embodiment 9. However, the characteristics of the lens system 11 are adjusted so that the amount of change in image height with respect to a change in the image angle is made further larger at the peripheral parts than at the middle part of the image. Hereinafter, a description is given mainly of the characteristics of the lens system 11 according to Embodiment 10. Also, since construction similar to that of the apparatus for monitoring a vehicle periphery according to the above-described Embodiment 1 through Embodiment 9 can be employed except for the characteristics of the lens system 11, parts which correspond to each other are given the same reference numbers, and description thereof is omitted.

An apparatus for monitoring a vehicle periphery according to Embodiment 10 is provided with a camera unit 1, a display unit 3 and a controlling unit 5 as in Embodiment 1 shown in FIG. 1.

The camera unit 1 has a construction similar to that of the camera unit 1 shown in, for example, FIG. 2. For example, as shown in FIG. 3 and FIG. 4, the camera unit 1 is installed at the middle part of the front end part of a vehicle, so that a wide range of visual field A4 from the forward front surface (including the diagonally downward part of a vehicle) at the forward side thereof to the left and right side parts can be picked up. The camera unit 1 is attached to a vehicle by screws via, for example, a bracket.

In order to protect the camera unit 1 from rain and wind, the entirety of the camera unit 1 is accommodated in a waterproof case 15 sealed by an O-ring (not illustrated), wherein only the front surface part of a lens 25a at the front end part is exposed to the front side of the waterproof case 15.

A pickup element 13 is composed of, for example, CCD. Hereinafter, a description is based on the assumption that the pickup element 13 has a ¼-inch type pickup plane whose dimension is 3.6 mm in the horizontal direction and 2.8 mm in the vertical direction.

The visual field angle H in the horizontal direction of the lens system 11 according to Embodiment 10 is set to 180 degrees or more and 270 degrees or less (for example, 190 degrees) as in the above-described embodiments 1 through 9.

Figure 33:
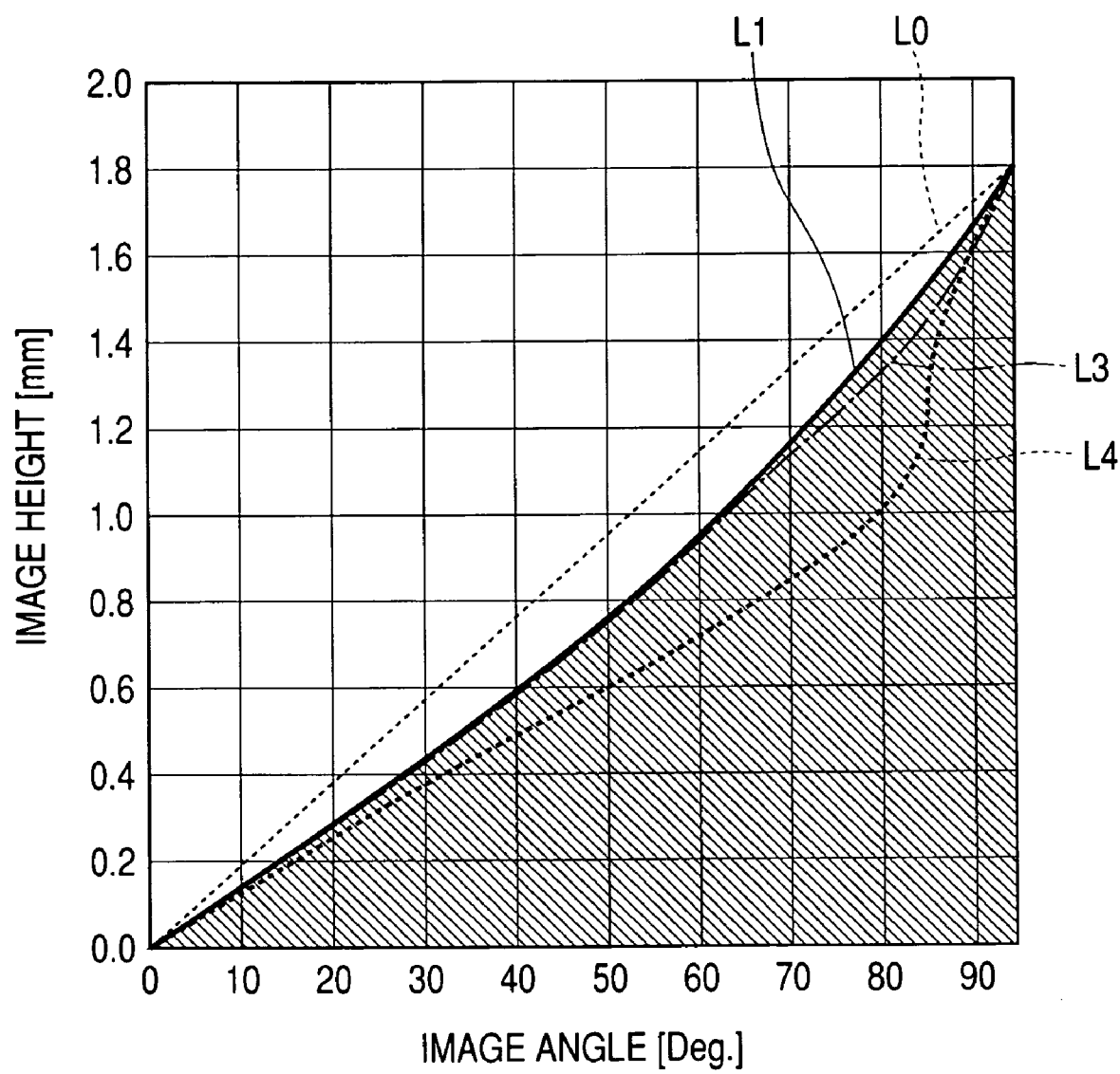
FIG. 33 is a view showing characteristics of a lens system according to Embodiment 10 of the invention.

FIG. 33 is a view showing the characteristics pertaining to the horizontal direction of the lens system 11 according to Embodiment 10. FIG. 33 shows a curved line L4 (Bold dashed line) indicating the relationship (hereinafter called a "image angle/image height property") between the image height of respective image portions on an image formed on the pickup element 13 and the image angle (incident angle with respect to the optical axis) of light rays made incident into the respective image portions. Also, in FIG. 33, a curved line L0 (Broken line) showing the image angle/image height property of a general fisheye lens and a curved line L1 (Thick line) showing the image angle/image height property of the lens system 11 according to Embodiment 1 described above are shown as comparison. In addition, in FIG. 33, the axis of ordinates shows the image height of respective image portions of an image formed on the pickup element 13 while the axis of abscissas shows the image angle (incident angle with respect to the optical axis) of light rays made incident into the respective image portions.

For example, as shown with the curved line L4 in FIG. 33, the lens system 11 according to Embodiment 10 is composed, as its entirety, so that the lens system is composed so that an image height Y of respective image portions shifted from the image center of the image formed on the pickup element into the horizontal direction and an image angle θ of light rays made incident into the respective image portions meets the relationship of $Y < 2f \cdot \tan(\theta/2)$, where the focal distance of the lens system in the horizontal direction is f (herein, f is the focal distance of the lens system 11 with respect to its horizontal direction).

In detail, for example, excepting the second lens group 27, the image height Y of respective parts of an image formed on the light receiving plane of the pickup element 13 by the lens system 11 and the angle of light rays made incident into the respective parts meets the relationship of $Y < 2f \cdot \tan(\theta/2)$ where the focal distance of the lens system 11 in the horizontal direction is f.

Also, the characteristics of a general fisheye lens (employing a system so called "equidistant projection") in the horizontal direction thereof are, as shown by the curved line L0 in FIG. 33, such that the image height Y pertaining to the above-described horizontal direction, image angle θ and focal distance f of the lens system 11 in the horizontal direction meet the relationship of:

$Y = f\theta$

The characteristics of the lens system (employing a system called a "cubic projection system") according to Embodiment 1 with respect to its horizontal direction are, as shown by the curved line L1 in FIG. 33, that the image height Y pertaining to the above-described horizontal direction, image angle θ and focal distance f of the lens system 11 in the horizontal direction meet the relationship of:

$Y = 2f \cdot \tan(\theta/2)$.

Figure 34:
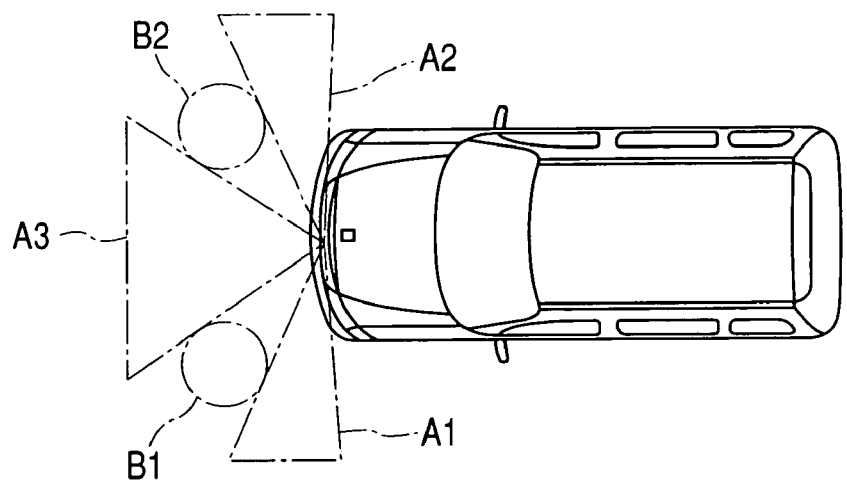
FIG. 34 is a view showing an installation pattern of a camera unit according to JP-A-2000-89301 in a vehicle.
Figure 35:
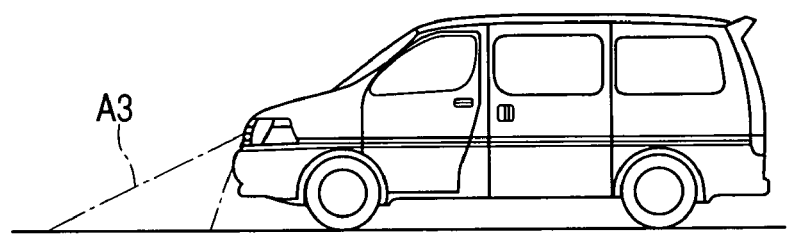
FIG. 35 is a view showing an installation pattern of a camera unit according to JP-A-2000-89301 in a vehicle.
Figure 36:
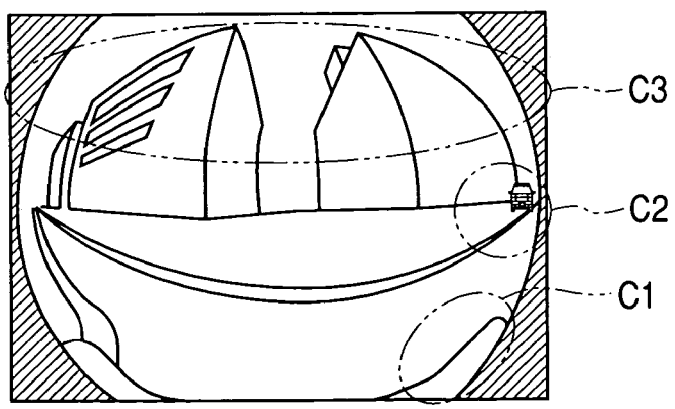
FIG. 36 is a view showing a picked-up image of a vehicle rearward confirming unit according to JP-A-7-285379.

Here, where it is assumed that the image angle/image height property (Curved Line L0) as in a general fisheye lens is provisionally employed as the image angle/image height property of the lens system 11, as shown in FIG. 36, an object C2 in the periphery with respect to the horizontal direction is picked up to be small, wherein it is very difficult for a driver to recognize a vehicle approaching from forward left and right sides of the one's own vehicle. Also, where it is assumed that the image angle/image height property (Curved line L1) is provisionally employed as in the lens system pertaining to Embodiment 1, an object in the peripheries with respect to the horizontal direction is formed to be comparatively large, and it becomes easier for a driver to recognize a vehicle approaching from the forward left and right sides of one's own vehicle in comparison with a case where the image angle/image height property as in a general fisheye lens is employed. However, in comparison with JP-A-2000-89301 in which a vehicle approaching from sideward of one's own vehicle is picked up with a mirror and a prism, etc., provided at the front side of the camera as shown in FIG. 34 and FIG. 35, paying attention only to the ease in recognizing a vehicle approaching from the forward left and right sides of one's own vehicle, an object in the peripheries with respect to the horizontal direction are picked up to be small, and it is difficult for a driver to recognize a vehicle approaching from the forward left and right sides of one's own vehicle.

Therefore, in the lens system 11 according to Embodiment 10, the image angle/image height property of the outer circumferential portion of the lens system 11 is varied from the image angle/image height property of the lens system according to Embodiment 1 so that an object in the periphery with respect to the horizontal direction can be picked up to be large.

In detail, for example, as shown by the curved line L4 in FIG. 33, the lens system 11 is designed so that the image height Y becomes 1.0 when the image angle θ is equal to 80 degrees, and the image height Y becomes 1.6 mm when the image angle θ is equal to 90 degrees. The image angle/image height property around the image angle θ being 80 through 90 degrees in the horizontal direction in the lens system 11 is designed, aiming at the characteristics by which an object can be picked up at almost the same size as that in a case where it is constructed that the respective ranges of visual fields in the left and right directions in JP-A-2000-89301, shown in FIG. 34 and FIG. 35, become 60 degrees in total.

Thus, the lens system 11 according to the present embodiment is constructed so that the amount of change in image height with respect to a change in the image angle is further increased at the peripheries than at the middle part of an image rather than employed the image angle/image height property (Curved line L1) according to the lens system according to Embodiment 1. Therefore, at the peripheral parts in the horizontal direction in the picked up visual field A4 (FIG. 3), the image of an object at the peripheral parts can be formed to be large on the pickup element 13. That is, it is possible to improve visual confirmation of an object image at the peripheral parts in the range of visual field.

Further, in JP-A-2000-89301 shown in FIG. 34 and FIG. 35, for example, where such a construction is employed, in which the respective ranges of visual fields in the left and right directions become 85 degrees in total, visual confirmation of a vehicle approaching from the left and right directions can be improved. Therefore, where it is assumed that the image angle/image height property around the image angle being 80 through 90 degrees in the horizontal direction in the lens system 1.1 according to Embodiment 10 is set, aiming at the characteristics by which an object can be picked up at almost the same size as that in the case where the respective ranges of visual fields in the left and right directions in JP-A-2000-89301 shown in FIG. 34 and FIG. 35 become 85 degrees in total, the image angle/image height property pertaining to the horizontal direction of the lens system 11 becomes such as shown in the curved line L3 (two-dashed chain line) in FIG. 33. In addition, even if the image angle/image height property of the lens system 11 is thus set, the lens system 11 is constructed so that the image height Y pertaining to the horizontal direction, image angle and focal distance f of the lens system 11 pertaining to the horizontal direction meet the relationship of: Y<2f·tan(θ/2) as shown by the curved lines L1 and L3 in FIG. 33.

That is, such characteristics as shown by the curved line L4 in FIG. 33 are employed as the image angle/image height property pertaining to the horizontal direction of the lens system 11 according to the present embodiment. However, it is not necessary characteristics are not limited to the above. If the lens system 11 is constructed so that the image height Y pertaining to the horizontal direction, image angle θ and focal distance f of the lens system 11 pertaining to the horizontal direction meet the relationship of:

$Y<2f\cdot\tan(\theta/2)$, an image of an object at the peripheries can be formed to be further larger at the peripheries in the horizontal direction in the range A4 of visual field (FIG. 3) than in the case where such an image angle/image height property (Curved line L1) as shown in the lens system according to Embodiment 1 is employed. As a result, visual confirmation with respect to a vehicle approaching from the left and right directions can be further improved.

In addition, as described above, if the image angle/image height property (Curved line L0) pertaining to a general fisheye lens is employed, the amount of change in the image height with respect to a change in the image angle becomes the same at both the middle part of an image and the peripheral parts thereof, wherein visual confirmation of a vehicle approaching from the left and right directions is worsened. Therefore, the lens system 11 is constructed so that the amount of change in image height with respect to a change in image angle is made larger at the peripheral parts than at the middle part of an image. That is, only by constructing the lens system 11 so that the image height Y pertaining to the horizontal direction, image angle θ and focal distance f of the lens system 11 pertaining to the horizontal direction meet the relationship of $Y<f\cdot\theta$, it is possible to greatly form an image of an object at the peripheral parts on the pickup element 13 even at the peripheral parts in the horizontal direction in the range A4 of visual field A4 (FIG. 3) in comparison with a case where the image angle/image height property pertaining to a general fisheye lens is applied to the lens system 11, wherein visual confirmation of an object image at the peripheral parts in the range of visual field can be improved.

That is, in order to improve visual confirmation of an object image at the peripheral parts in a range of visual field, it is preferable that the lens system 11 is constructed so as for the image height Y pertaining to the horizontal direction, image angle and focal distance f of the lens system 11 pertaining to the horizontal direction to meet the relationship of Y<f·θ.

In addition, it is further preferable that the lens system 11 is constructed so as to meet the relationship of Y<2f·tan(θ/2).

An peripheral image formed on the pickup element 13 plane is transmitted to the image processing portion 5b of the controlling unit 5 as in the above-described Embodiment 1 through 9, and is subjected to image processing by an instruction of the changeover controlling portion 5a. After that, the picked-up and image-processed image is displayed in the display unit 3.

Also, in the present embodiment, as described above, although a description was given of an example in which the camera unit 1 is installed at the front end portion of a vehicle as shown in FIG. 3 and FIG. 4 as in Embodiment 1, the camera unit 1 may be installed at various positions with respect to the vehicle, for example, at the rear side of a vehicle as in Embodiments 2, 8, and 9.

Further, the content of image processing of a picked-up image in the image processing portion 5b and picked-up image in the display unit 3, which are similar to those of the above-described Embodiment 1 through Embodiment 9, may be listed as detailed examples thereof. In addition, an image having a display pattern similar to the display pattern pertaining to the rearward in the above-described Embodiment 8 and Embodiment 9 may be displayed on the basis of the picked-up image obtained by the pickup camera 1 incorporated at the rear part of a vehicle.

Further, as in the above-described Embodiment 5 and Embodiment 6, the lens system 11 may be constructed, by, for example, variously changing the construction of the respective lens groups included in the lens system 11, so that the image height Y pertaining to the horizontal direction, image angle θ, and focal distance f of the lens system 11 pertaining to the horizontal direction meet the relationship of $Y<f\cdot\theta$, further preferably, the lens system 11 may be constructed so as to meet Y<2f·tan(θ/2).

As described above, according to the camera unit 1 according to the present embodiment, as in the lens system 11 according to Embodiment 1, since the lens system 11 is constructed so that the amount of change in image height with respect to a change in image angle is made larger at the peripheral parts than at the middle part of an image, it is possible to improve visual confirmation of an object image at the peripheral parts in a range of visual field. In detail, if the lens system 11 is constructed so that the image height Y pertaining to the horizontal direction, image angle θ, and focal distance f of the lens system 11 pertaining to the horizontal direction meet the relationship of $Y<f\cdot\theta$, it is possible to improve visual confirmation of an object image at the peripheral parts pertaining to the horizontal direction in a range of visual field. Also, as in JP-A-2000-89301, since any special members such as a prism, etc., are not required, the construction of the camera unit 1 can be simplified.

Further, if the lens system 11 is constructed so that the amount of change in image height with respect to a change in image angle is made further larger at the peripheral parts than at the middle part of an image, it is possible to further improve visual confirmation of an object image at the peripheral parts in a range of visual field. In detail, if the lens system 11 is constructed so that the image height Y pertaining to the horizontal direction, image angle θ, and focal distance f of the lens system 11 pertaining to the horizontal direction meet the relationship of $$Y<2f\cdot\tan(\theta/2)$$

it is possible to further improve visual confirmation of an object image at the peripheral parts pertaining to the horizontal direction in a range of visual field.

In addition, since the visual field angle H in the horizontal direction, which is brought about by the lens system 11, is set to 180 degrees or more and 270 degrees or less as in the above-described Embodiment 1 through Embodiment 9, it is possible to pick up a wide range of visual field in the horizontal direction.

Also, although, in the above-described Embodiment 10, the lens system 11 is constructed so that, in the horizontal direction, the amount of change in image height with respect to a change in image angle is made larger at the peripheral parts than at the middle part of an image, the lens system 11 may be constructed, in order to improve visual confirmation of an object image at the peripheral parts in a range of visual field, the amount of change in image height with respect to a change in image angle is made larger at the peripheral parts than at the middle part of an image in not only the horizontal and vertical directions but also in all the directions.

Further, in order to improve visual confirmation of an object image at the peripheral parts in a range of visual field, the lens system 11 may be constructed so that the image height Y, image angle and the focal distance f of the lens system 11 can preferably meet the relationship of Y<f·θ, and further preferably the lens system may be constructed so as to meet the relationship of Y<2f·tan(θ/2).

What is claimed is:

1. A camera unit for monitoring a vehicle periphery comprising:
    a pickup element; and
    a lens system in which light rays from a prescribed range of a visual field are imaged onto the pickup element, wherein
        with respect to a relationship between an image height of respective image portions on an image formed on the pickup element and an image angle of the light lays made incident into the respective image portions, the lens system is configured so that an amount of change in the image height with respect to a change in the image angle is greater at a peripheral portion of the image than at a center part of the image,
    the lens system comprises:
        (1) a first lens system which is a wide angle lens system configured to be a fisheye lens and
        (2) a second lens system which is an anamorphic lens system which enlarges in the vertical direction the image formed on the pickup element, and
    a focal distance of the lens system is in the horizontal direction.

2. The camera unit of claim 1, wherein
    the lens system is configured so that an image height Y of the respective image portions shifted from an image center of the image formed on the pickup element into a horizontal direction and an image angle θ of light rays made incident into the respective image portions meets the relationship of $$Y<f\cdot\theta,$$

where f is the focal distance of the lens system in the horizontal direction.

3. The camera unit of claim 1, wherein
    the lens system is configured so that an image height Y of the respective image portions shifted from an image center of the image formed on the pickup element into a horizontal direction and an image angle θ of light rays made incident into the respective image portions meets the relationship of $$Y<2f\cdot\tan(\theta/2),$$

where f is a focal distance of the lens system in the horizontal direction.

4. The camera unit of claim 1, wherein
    the lens system is configured so that an image height Y of the respective image portions shifted from an image center of the image formed on the pickup element into a horizontal direction and an image angle θ of light rays made incident into the respective image portions meets the relationship of $$Y=pf\cdot\tan(\theta/p),$$

where 1<p<4, and f is the focal distance of the lens system in the horizontal direction.

5. The camera unit of claim 4, wherein p=2.

6. The camera unit of claim 1, wherein
    a visual field angle of the lens system in the horizontal direction is 180 degrees or more and 270 degrees or less.

7. An apparatus which monitors a vehicle periphery, installed in a vehicle comprising:
    the camera unit of claim 1, which picks up peripheries of the vehicle; and
    a display unit which displays an image picked up by the camera unit.

8. The camera unit of claim 1, wherein the anamorphic lens system is disposed between the wide angle lens system and the pickup element.

9. A camera unit for monitoring a vehicle periphery comprising:
    a pickup element; and
    a lens system in which light rays from a prescribed range of a visual field are imaged onto the pickup element, wherein
        with respect to a relationship between an image height of respective image portions on an image formed on the pickup element and an image angle of the light lays made incident into the respective image portions, the lens system is configured so that an amount of change in the image height with respect to a change in the image angle is greater at a peripheral portion of the image than at a center part of the image, and
    the lens system comprises:
        (1) a wide angle lens system configured to be a fisheye lens and
        (2) an anamorphic lens system which enlarges in the vertical direction the image formed on the pickup element,
    a focal distance of the lens system is in the horizontal direction, and
    the anamorphic lens system is disposed between the wide angle lens system and the pickup element.

* * * * *